United States Patent
Hlavac et al.

(10) Patent No.: US 11,762,952 B2
(45) Date of Patent: Sep. 19, 2023

(54) ARTIFICIAL REALITY APPLICATION LIFECYCLE

(71) Applicant: Meta Platforms Technologies, LLC, Menlo Park, CA (US)

(72) Inventors: Michal Hlavac, Seattle, WA (US); Jasper Stevens, London (GB); Arthur Zwiegincew, Medina, WA (US); Alexander Michael Louie, Milpitas, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/360,836

(22) Filed: Jun. 28, 2021

(65) Prior Publication Data
US 2022/0414403 A1 Dec. 29, 2022

(51) Int. Cl.
*G06F 3/0484* (2022.01)
*G06F 3/0482* (2013.01)
(Continued)

(52) U.S. Cl.
CPC .......... *G06F 18/2178* (2023.01); *G06F 3/011* (2013.01); *G06F 3/017* (2013.01);
(Continued)

(58) Field of Classification Search
CPC .. G06K 9/6263; G06K 9/6215; G06K 9/6277; G06F 3/011; G06F 3/017;
(Continued)

(56) References Cited

U.S. PATENT DOCUMENTS

| 770,149 A | 9/1904 | Bailey |
| 3,055,404 A | 9/1962 | Anderson |

(Continued)

FOREIGN PATENT DOCUMENTS

| EP | 2887322 B1 | 2/2020 |
| WO | 2018235371 A1 | 12/2018 |

(Continued)

OTHER PUBLICATIONS

"Unity Gets Toolkit for Common AR/VR Interactions" [accessed Apr. 7, 2020]. Unity XR Interaction Toolkit Preview Dec. 19, 2019.

(Continued)

*Primary Examiner* — Jordany Nunez
(74) *Attorney, Agent, or Firm* — Potomac Law Group, PLLC

(57) ABSTRACT

Aspects of the present disclosure are directed to an artificial reality (XR) application system controlling applications in an artificial reality environment. In various cases, these controls include automatically suggesting XR applications by determining an XR context and identifying applications that match the XR context. These applications can be suggested to a user, who can authorize their execution, setting permissions for the application. In some cases, applications can be divided into components which can be progressively downloaded. By providing application suggestions relevant to the current context and progressively downloading application components, applications can appear ambient, rather than relying on users to constantly download, install, or activate applications. Permissions for applications may be revoked permanently or for certain situations—either through user permissions selections or automatically in response to determined user intents. When multiple applications are simultaneously authorized to (Continued)

execute, the XR application system can employ a ranking system to prevent overcrowding.

18 Claims, 16 Drawing Sheets

(51) Int. Cl.
| | |
|---|---|
| *G06F 3/0481* | (2022.01) |
| *G06F 18/21* | (2023.01) |
| *G06N 20/00* | (2019.01) |
| *G06F 18/22* | (2023.01) |
| *G06F 18/2415* | (2023.01) |
| *G06F 3/01* | (2006.01) |
| *G06F 3/0486* | (2013.01) |
| *G06F 21/62* | (2013.01) |

(52) U.S. Cl.
CPC ............ *G06F 3/0486* (2013.01); *G06F 18/22* (2023.01); *G06F 18/2415* (2023.01); *G06F 21/629* (2013.01); *G06N 20/00* (2019.01); *G06F 3/0482* (2013.01)

(58) Field of Classification Search
CPC .... G06F 3/0486; G06F 21/629; G06F 3/0482; G06N 20/00
See application file for complete search history.

(56) References Cited

U.S. PATENT DOCUMENTS

| | | |
|---|---|---|
| 3,081,177 A | 3/1963 | Edward et al. |
| 3,117,274 A | 1/1964 | Pierre et al. |
| 3,292,089 A | 12/1966 | Earnest et al. |
| 3,477,368 A | 11/1969 | Spaulding et al. |
| 3,530,252 A | 9/1970 | Puente et al. |
| 3,558,759 A | 1/1971 | Sarem et al. |
| 3,726,233 A | 4/1973 | Swartz |
| 3,817,472 A | 6/1974 | Abe |
| 3,947,351 A | 3/1976 | Asawa et al. |
| 5,335,991 A | 8/1994 | Wobbe |
| 5,842,175 A | 11/1998 | Andros et al. |
| 6,842,175 B1 | 1/2005 | Schmalstieg et al. |
| 7,650,575 B2 | 1/2010 | Cummins et al. |
| 7,701,439 B2 | 4/2010 | Hillis et al. |
| 8,335,991 B2 | 12/2012 | Douceur et al. |
| 8,558,759 B1 | 10/2013 | Gomez et al. |
| 8,726,233 B1 | 5/2014 | Raghavan |
| 8,947,351 B1 | 2/2015 | Noble |
| 9,055,404 B2 | 6/2015 | Setlur et al. |
| 9,081,177 B2 | 7/2015 | Wong et al. |
| 9,117,274 B2 | 8/2015 | Liao et al. |
| 9,292,089 B1 | 3/2016 | Sadek |
| 9,477,368 B1 | 10/2016 | Filip et al. |
| 9,530,252 B2 | 12/2016 | Poulos et al. |
| 9,817,472 B2 | 11/2017 | Lee et al. |
| 10,220,303 B1 | 3/2019 | Schmidt et al. |
| 10,248,284 B2 | 4/2019 | Itani et al. |
| 10,473,935 B1 | 11/2019 | Gribetz et al. |
| 10,521,944 B2 | 12/2019 | Sareen et al. |
| 10,909,762 B2 * | 2/2021 | Karalis .................. G06T 11/60 |
| 10,963,144 B2 | 3/2021 | Fox et al. |
| 11,017,609 B1 | 5/2021 | Buzzerio et al. |
| 11,126,320 B1 | 9/2021 | Thompson et al. |
| 11,176,755 B1 | 11/2021 | Tichenor et al. |
| 11,238,664 B1 * | 2/2022 | Tavakoli ............ G06Q 30/0631 |
| 2008/0089587 A1 | 4/2008 | Kim et al. |
| 2009/0313299 A1 | 12/2009 | Bonev et al. |
| 2010/0251177 A1 | 9/2010 | Geppert et al. |
| 2010/0306716 A1 | 12/2010 | Perez |
| 2011/0267265 A1 | 11/2011 | Stinson |
| 2012/0069168 A1 | 3/2012 | Huang et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0051615 A1 * | 2/2013 | Lim ........................ G06V 20/20 |
| | | 382/103 |
| 2013/0063345 A1 | 3/2013 | Maeda |
| 2013/0069860 A1 | 3/2013 | Davidson |
| 2013/0117688 A1 | 5/2013 | Yerli |
| 2013/0125066 A1 | 5/2013 | Klein et al. |
| 2013/0147793 A1 | 6/2013 | Jeon et al. |
| 2013/0169682 A1 | 7/2013 | Novak et al. |
| 2013/0265220 A1 | 10/2013 | Fleischmann et al. |
| 2014/0125598 A1 | 5/2014 | Cheng et al. |
| 2014/0149901 A1 | 5/2014 | Hunter |
| 2014/0236996 A1 | 8/2014 | Masuko et al. |
| 2014/0268065 A1 | 9/2014 | Ishikawa et al. |
| 2014/0357366 A1 | 12/2014 | Koganezawa et al. |
| 2014/0375683 A1 | 12/2014 | Salter et al. |
| 2014/0375691 A1 | 12/2014 | Kasahara |
| 2015/0015504 A1 | 1/2015 | Lee et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0077592 A1 | 3/2015 | Fahey |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0253862 A1 | 9/2015 | Seo et al. |
| 2015/0261659 A1 | 9/2015 | Bader et al. |
| 2015/0356774 A1 | 12/2015 | Gal et al. |
| 2016/0026253 A1 | 1/2016 | Bradski et al. |
| 2016/0063762 A1 | 3/2016 | Heuvel et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0180590 A1 | 6/2016 | Kamhi et al. |
| 2016/0378291 A1 | 12/2016 | Pokrzywka |
| 2017/0060230 A1 | 3/2017 | Faaborg et al. |
| 2017/0075420 A1 | 3/2017 | Yu et al. |
| 2017/0076500 A1 | 3/2017 | Maggiore et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0242675 A1 | 8/2017 | Deshmukh |
| 2017/0243465 A1 | 8/2017 | Bourne, Jr. et al. |
| 2017/0262063 A1 | 9/2017 | Blénessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 * | 10/2017 | Lopez-Uricoechea ..................... |
| | | G01C 21/34 |
| 2017/0323488 A1 | 11/2017 | Mott et al. |
| 2017/0364198 A1 | 12/2017 | Yoganandan et al. |
| 2017/0372225 A1 * | 12/2017 | Foresti .................. G06Q 30/02 |
| 2018/0059901 A1 | 3/2018 | Gullicksen |
| 2018/0095616 A1 | 4/2018 | Valdivia et al. |
| 2018/0107278 A1 | 4/2018 | Goel et al. |
| 2018/0113599 A1 | 4/2018 | Yin |
| 2018/0189647 A1 * | 7/2018 | Calvo ...................... G06N 3/08 |
| 2018/0300557 A1 | 10/2018 | Rodenas et al. |
| 2018/0307303 A1 | 10/2018 | Powderly et al. |
| 2018/0322701 A1 | 11/2018 | Pahud et al. |
| 2018/0335925 A1 | 11/2018 | Hsiao et al. |
| 2018/0357780 A1 | 12/2018 | Young et al. |
| 2019/0005724 A1 | 1/2019 | Pahud et al. |
| 2019/0094981 A1 | 3/2019 | Bradski et al. |
| 2019/0107894 A1 | 4/2019 | Hebbalaguppe et al. |
| 2019/0114061 A1 * | 4/2019 | Daniels ............... G06F 3/04847 |
| 2019/0155481 A1 | 5/2019 | Diverdi et al. |
| 2019/0163700 A1 * | 5/2019 | Baumgardner ..... G06F 16/4387 |
| 2019/0172262 A1 | 6/2019 | McHugh et al. |
| 2019/0197785 A1 | 6/2019 | Tate-Gans et al. |
| 2019/0212827 A1 | 7/2019 | Kin et al. |

(56) References Cited

U.S. PATENT DOCUMENTS

| | | | |
|---|---|---|---|
| 2019/0213792 A1 | 7/2019 | Jakubzak et al. | |
| 2019/0235729 A1 | 8/2019 | Day et al. | |
| 2019/0237044 A1 | 8/2019 | Day et al. | |
| 2019/0258318 A1 | 8/2019 | Qin et al. | |
| 2019/0278376 A1 | 9/2019 | Kutliroff et al. | |
| 2019/0279424 A1 | 9/2019 | Clausen et al. | |
| 2019/0279426 A1 | 9/2019 | Musunur et al. | |
| 2019/0286231 A1 | 9/2019 | Burns et al. | |
| 2019/0340833 A1 | 11/2019 | Furtwangler et al. | |
| 2019/0362562 A1 | 11/2019 | Benson | |
| 2019/0369391 A1 | 12/2019 | Cordesses et al. | |
| 2019/0377406 A1* | 12/2019 | Steptoe | A63F 13/211 |
| 2019/0377416 A1 | 12/2019 | Alexander | |
| 2019/0377487 A1 | 12/2019 | Bailey et al. | |
| 2019/0385371 A1 | 12/2019 | Joyce et al. | |
| 2020/0066047 A1* | 2/2020 | Karalis | G06T 19/006 |
| 2020/0082629 A1 | 3/2020 | Jones et al. | |
| 2020/0097077 A1 | 3/2020 | Nguyen et al. | |
| 2020/0097091 A1 | 3/2020 | Chou et al. | |
| 2020/0218423 A1 | 7/2020 | Ohashi | |
| 2020/0219319 A1* | 7/2020 | Lashmar | G06Q 30/0269 |
| 2020/0225736 A1 | 7/2020 | Schwarz et al. | |
| 2020/0225758 A1 | 7/2020 | Tang et al. | |
| 2020/0226814 A1 | 7/2020 | Tang et al. | |
| 2020/0279429 A1 | 9/2020 | Upadhyay et al. | |
| 2020/0285761 A1 | 9/2020 | Buck et al. | |
| 2020/0351273 A1* | 11/2020 | Thomas | H04N 21/84 |
| 2020/0363924 A1 | 11/2020 | Flexman et al. | |
| 2020/0363930 A1 | 11/2020 | Srinivasan et al. | |
| 2021/0012113 A1 | 1/2021 | Petill et al. | |
| 2021/0014408 A1 | 1/2021 | Timonen et al. | |
| 2021/0097768 A1 | 4/2021 | Malia et al. | |
| 2021/0192856 A1 | 6/2021 | Lee | |
| 2021/0272375 A1* | 9/2021 | Lashmar | G06F 3/04815 |
| 2021/0295602 A1 | 9/2021 | Scapel et al. | |
| 2021/0306238 A1 | 9/2021 | Cheng et al. | |
| 2021/0390765 A1 | 12/2021 | Laaksonen et al. | |
| 2022/0084279 A1 | 3/2022 | Lindmeier et al. | |
| 2022/0091722 A1 | 3/2022 | Faulkner et al. | |
| 2022/0101612 A1 | 3/2022 | Palangie et al. | |
| 2022/0121344 A1 | 4/2022 | Pastrana Vicente et al. | |
| 2022/0139052 A1 | 5/2022 | Tavakoli et al. | |
| 2022/0406021 A1* | 12/2022 | Lebeau | H04R 3/00 |
| 2023/0152851 A1* | 5/2023 | Berliner | G06F 1/1632 361/679.41 |

FOREIGN PATENT DOCUMENTS

| | | |
|---|---|---|
| WO | 2020226832 A1 | 11/2020 |
| WO | 2022055822 A1 | 3/2022 |

OTHER PUBLICATIONS

Hincapie-Ramos, J.D. et al. "GyroWand: IMU-based raycasting for augmented reality head-mounted displays." Proceedings of the 3rd ACM Symposium on Spatial User Interaction, Aug. 2015, pp. 89-98.

International Search Report and Written Opinion, PCT Patent Application PCT/US2020/051763, dated Feb. 3, 2021, 11 pages.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

Olwal, A. et al. "The Flexible Pointer: An Interaction Technique for Selection in Augmented and Virtual Reality," Proceedings of ACM Symposium on User Interface Software and Technology (UIST), pp. 81-82, publication date Nov. 5, 2003.

Renner, P. et al. "Ray Casting", [accessed Apr. 7, 2020], 2 pages.

Schweigert, R. et al. "EyePointing: A gaze-based selection technique." Proceedings of Mensch and Computer, Sep. 8, 2019, pp. 719-723.

Invitation to Pay Additional Fees for International Application No. PCT/US2021/044098, Nov. 3, 2021, 15 pages.

International Search Report and Written Opinion for International Application No. PCT/US2021/044098, dated Jan. 4, 2022, 22 pages.

Broitman A., "Learn and Do More with Lens in Google Images," Oct. 25, 2018, Retrieved from the Internet: URL: https://www.blog.google/products/search/learn-and-do-more-lens-google-images/, 4 pages.

International Search Report and Written Opinion for International Application No. PCT/US2022/032288, dated Sep. 16, 2022, 11 pages.

Melnick K., "Google Rolls out New AR Features for Its Lens APP," May 28, 2019, Retrieved from the Internet: URL: https://vrscout.com/news/new-ar-features-google-lens/, 3 pages.

Fleury C., et al., "A Generic Model for Embedding Users' Physical Workspaces into Multi-Scale Collaborative Virtual Environments," 20th International Conference on Artificial Reality and Telexistence, Dec. 3, 2010, 8 pages.

International Search Report and Written Opinion for International Application No. PCT/US2022/045510, dated Jan. 19, 2023, 10 pages.

Vitzthum A., "SSIML/Behaviour: Designing Behaviour and Animation of Graphical Objects in Virtual Reality and Multimedia Applications," Proceedings of the Seventh IEEE International Symposium on Multimedia, Dec. 12, 2005, 9 pages.

International Preliminary Report on Patentability for International Application No. PCT/US2021/044098, dated Mar. 9, 2023, 18 pages.

International Search Report and Written Opinion for International Application No. PCT/US2022/053780, dated Mar. 20, 2023, 10 pages.

* cited by examiner

ARTIFICIAL REALITY APPLICATION LIFECYCLE

TECHNICAL FIELD

The present disclosure is directed to controlling how artificial reality applications launch, what permissions to give the artificial reality applications, and establishing priority among the artificial reality applications.

BACKGROUND

Interaction with computing systems are often founded on a set of core concepts that define how users can interact with that computing system. For example, early operating systems provided textual interfaces to interact with a file directory. This was later built upon with the addition of "windowing" systems, whereby levels in the file directory and executing applications were displayed in multiple windows, each allocated a portion of a 2D display that was populated with content selected for that window. As computing form factors decreased in size and added integrated hardware capabilities (e.g., cameras, GPS, wireless antennas, etc.) the core concepts again evolved, moving to an "app" focus, where each app encapsulated a capability of the computing system.

Existing artificial reality systems provide models, such as 3D virtual objects and 2D panels, with which a user can interact in 3D space. Existing artificial reality systems have generally backed these models by extending the app core computing concept. For example, a user can instantiate these models by finding an app in an app store, activating the app and telling the app to create the model, and using the model as an interface back to the app. This approach generally requires users to manually discover apps relevant to their needs and requires continued execution of the app for the models to persist in the artificial reality environment.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
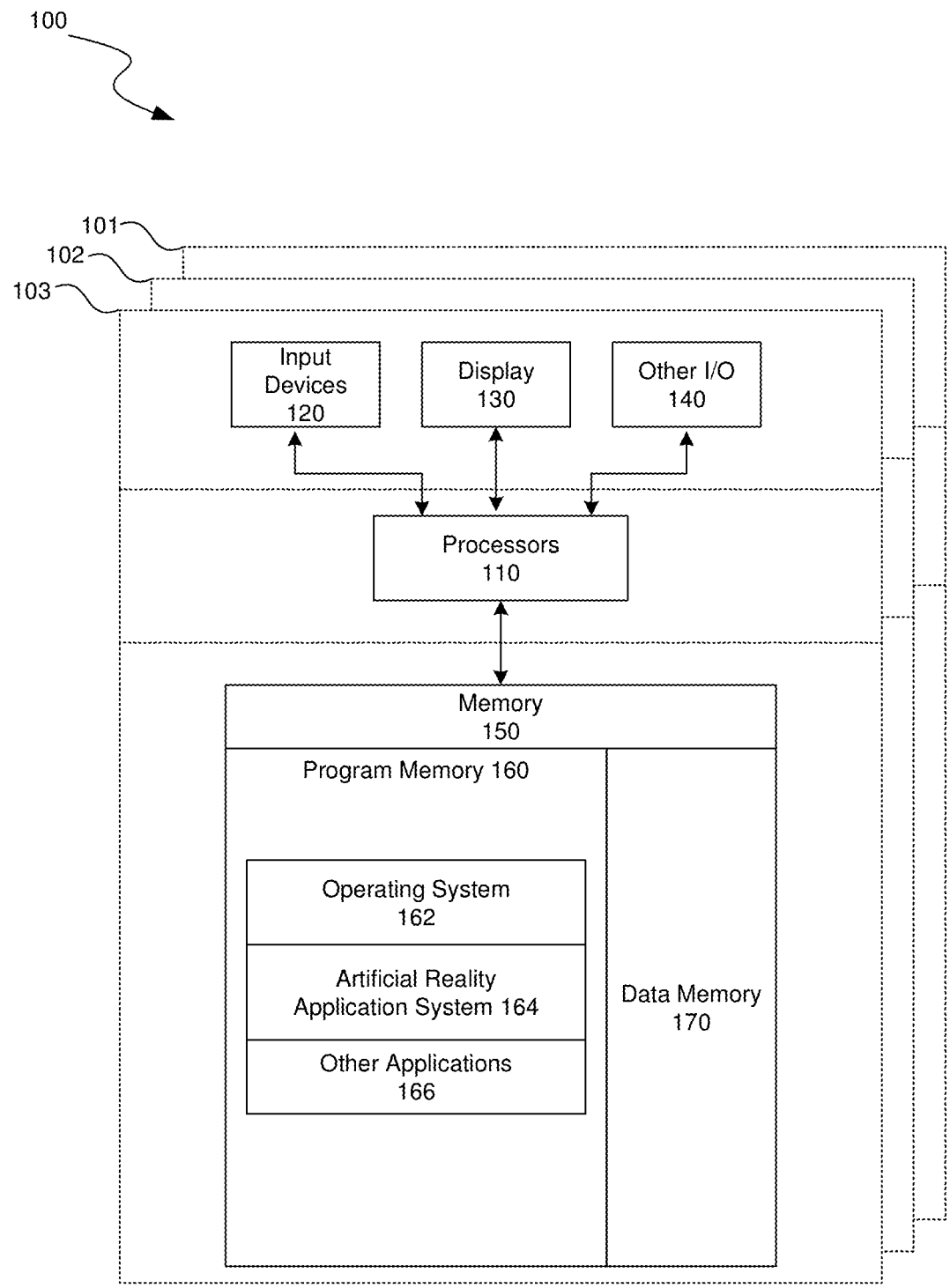
FIG. 1 is a block diagram illustrating an overview of devices on which some implementations of the present technology can operate.

Aspects of the present disclosure are directed to an artificial reality (XR) application system controlling applications in an artificial reality environment. In various cases, these controls include automatically suggesting XR applications. Such suggestions can be performed by identifying anchor points in an artificial reality environment, determining a current XR context, and identifying applications that match the identified anchor points and/or XR context. These applications can be suggested to a user, who can perform various actions to authorize their execution, setting permissions for the selected application to take actions such as writing content into the artificial reality environment, providing notifications, exchanging data with other applications, etc. In some implementations, applications can write content into the artificial reality environment through "augments." An "augment" is a 2D or 3D volume, in an artificial reality environment, that can include presentation data, context, and logic. Augments and their orchestration are discussed in greater detail U.S. patent application Ser. No. 17/008,478, titled "Artificial Reality Augments and Surfaces," (filed Aug. 31, 2020) and U.S. patent application Ser. No. 17/131,563, titled "Augment Orchestration in an Artificial Reality Environment," (filed Dec. 22, 2020), each of which is incorporated herein by reference.

In some cases, applications can be divided into components. The components of applications authorized for execution can be progressively downloaded. This allows the application to begin taking actions before all of its components are resident on the XR device. For example, when an application has been authorized and is triggered to create a particular type of augment, the components for creating and controlling that augment can be prioritized in the download of its components. This allows applications to load upon use, without having to wait for extensive download times.

By providing application suggestions relevant to the current artificial reality environment and context and progressively downloading application components, applications can appear as "ambient," i.e., with nearly instant access and working as always-on, rather than relying on users to constantly download, install, or activate applications for use within the artificial reality environment. Instead, the artificial reality application system analyzes the environment for various objects, contexts, etc.; downloads and installs applications that the user may find useful; and suggests the applications to the user. For example, when a user enters a particular grocery store, the system can check to see if that store has an application and suggest that application to the user. The user can then peel that application into her environment for activation, at which point the application is able to provide directions to items in the store, nutritional information and recipes for items the user views, and notices of specials and coupons.

Once an application has been authorized for execution, that authorization may be revoked permanently or for certain situations. The artificial reality application system can provide multiple ways for users to control which applications can access or manipulate the environment. In some cases, a user can access an "application manager" UI with options to find and customize applications enabled on the artificial reality application system. Through the application manager, a user can, for example, search for applications, disable/enable applications, set timers or events that trigger an application to be enabled/disabled, register/de-register objects and contexts the application can control or be made aware of, etc. In some implementations, the artificial reality application system can automatically mute or disable an application based on a context such as a threshold number of augments from an application being closed. For example, the system can mute messaging applications while the user is in a conversation or disable applications that produce augments the user regularly closes or ignores.

When multiple applications are simultaneously authorized to execute in an artificial reality environment, and in some cases on the same anchor points, the artificial reality environment can become cluttered and difficult to interact with. The artificial reality application system can employ a ranking system to limit the amount of augments that can be anchored to a particular surface, object, within a physical space, and/or within an area in the user's field of view. The artificial reality application system can define rankings among the applications that can write to a given anchor or area, where the rankings can account for a current context. The context can account for features such as a user context (e.g., user activity/posture, location, social graph connections to nearby users, calendar events for the user, known user routines, whether the user in a conversation, where user has been looking, user set preferences, etc.) and an artificial reality environment context (e.g., surfaces and objects in the artificial reality environment, current time, scene tags such as noisy, crowded, etc.) With the application rankings, and in some cases additional rules for allowing application output, the artificial reality application system can select threshold amounts of output from highest ranking applications for anchors and spaces.

As an example, multiple applications may be registered to provide information about food items (e.g., a recipe application, a diet application, and a food product comparison application), however, the artificial reality application system may only allow a single augment to be attached to any given real-world object. In this example, when a user is looking at two similar food items in a grocery store, the artificial reality application system generates a ranking based on a context of the user's location (grocery store), user preferences, and other augments already displayed in the artificial reality environment to determine that the food product comparison application is most likely to be useful to the user at the moment (i.e., is highest ranked) and is thus allowed to attach an augment to the recognized food item. Later, when the user is looking in her refrigerator at home, the recipe application is determined to have a higher ranking for that context and is allowed to place an augment on a recognized food item.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Multiple existing computing systems allow users to extend their functionality by installing additional applications. However, these existing system generally require a user to manually select, download, and execute applications. This is a time consuming process, it's a process that can be impossible for some users to navigate, and it can be extremely difficult to locate an application that is useful and relevant to a current context. Often by the time a user performs these actions, the context for which the application was desired has passed or users may not even attempt to locate a relevant application due to the hurdles involved. Further, once an application is identified, permissions for that application can be difficult to set or update. Yet further, existing computing systems fail to coordinate among applications, particularly in artificial reality systems where multiple application may provide crowded or even overlapping output, making navigating and working in the artificial reality environment difficult.

The artificial reality application system and processes described herein are expected to alleviate these deficiencies in the prior art. By providing context-based, automatic download, suggestions, and execution for applications, the disclosed artificial reality application system is able to provide timely and relevant applications, without the need to research applications for a given context or for interacting with confusing and complicated application "stores." In addition, by diving applications into components that are download as needed, applications can be executed at need, much more quickly than in existing systems. Further, by provisioning permissions both through automatic inferences and with a streamlined manual interface, users have faster and easier control of application permissions. In addition, by implementing context-based ranking to coordinate among applications, multiple applications configured to write to the same anchor or artificial reality environment area are limited, avoiding overcrowding and providing more relevant and timely information and interfaces. The systems and processes described herein operate in the technical field for application management in an artificial reality environment and, as such, are clearly rooted in computer technologies. These systems and processes provide new application interaction and control models, which are not analogs to exiting systems or know techniques.

Several implementations are discussed below in more detail in reference to the figures. FIG. 1 is a block diagram illustrating an overview of devices on which some implementations of the disclosed technology can operate. The devices can comprise hardware components of a computing system 100 that can provide automated, context-based applications suggestions, permissions controls, and orchestration. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, artificial reality application system 164, and other application programs 166. Memory 150 can also include data memory 170 that can include context factors, applications recommendation engine, permission setting, application activation settings, configuration data, settings, user interfaces, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
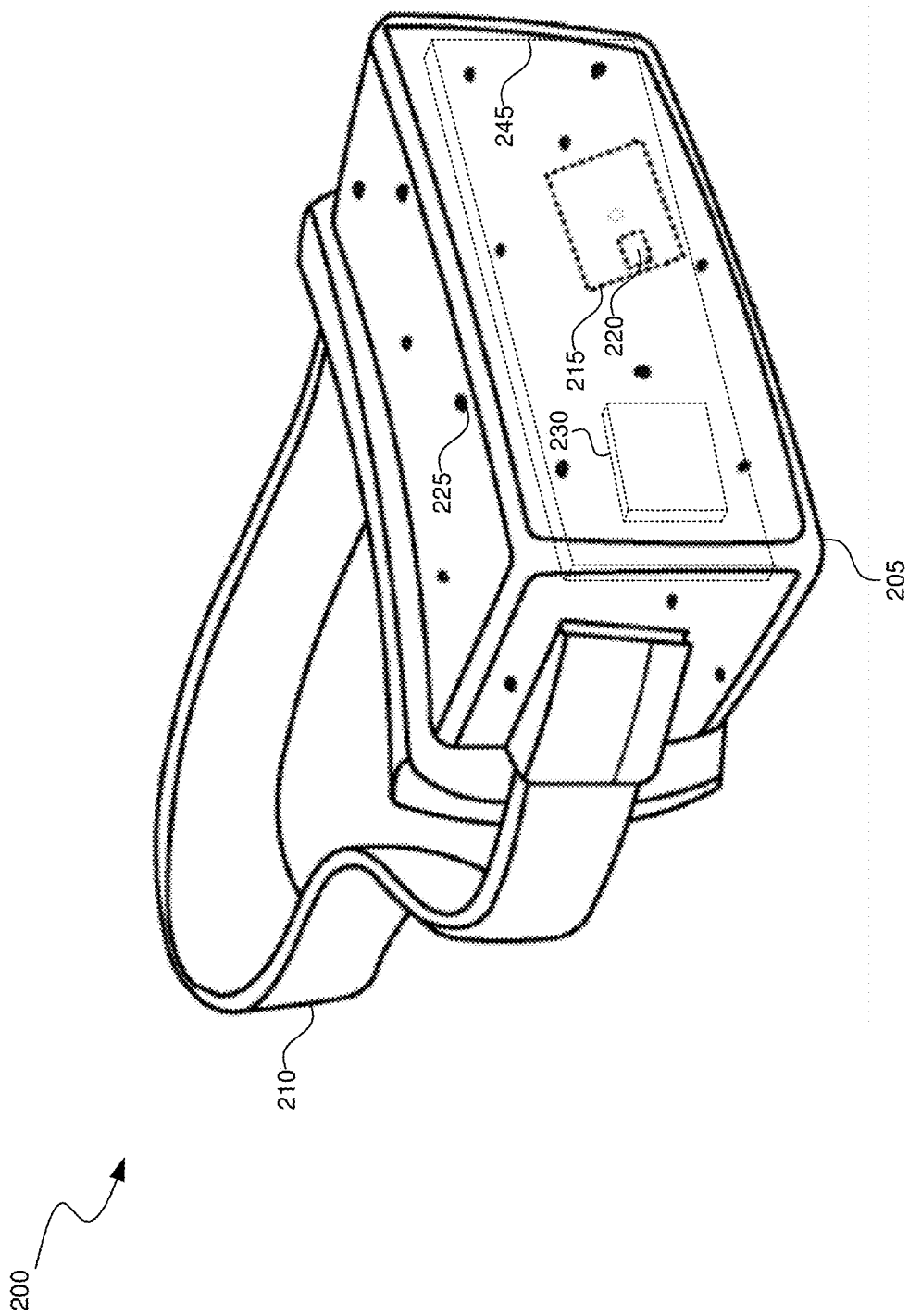
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
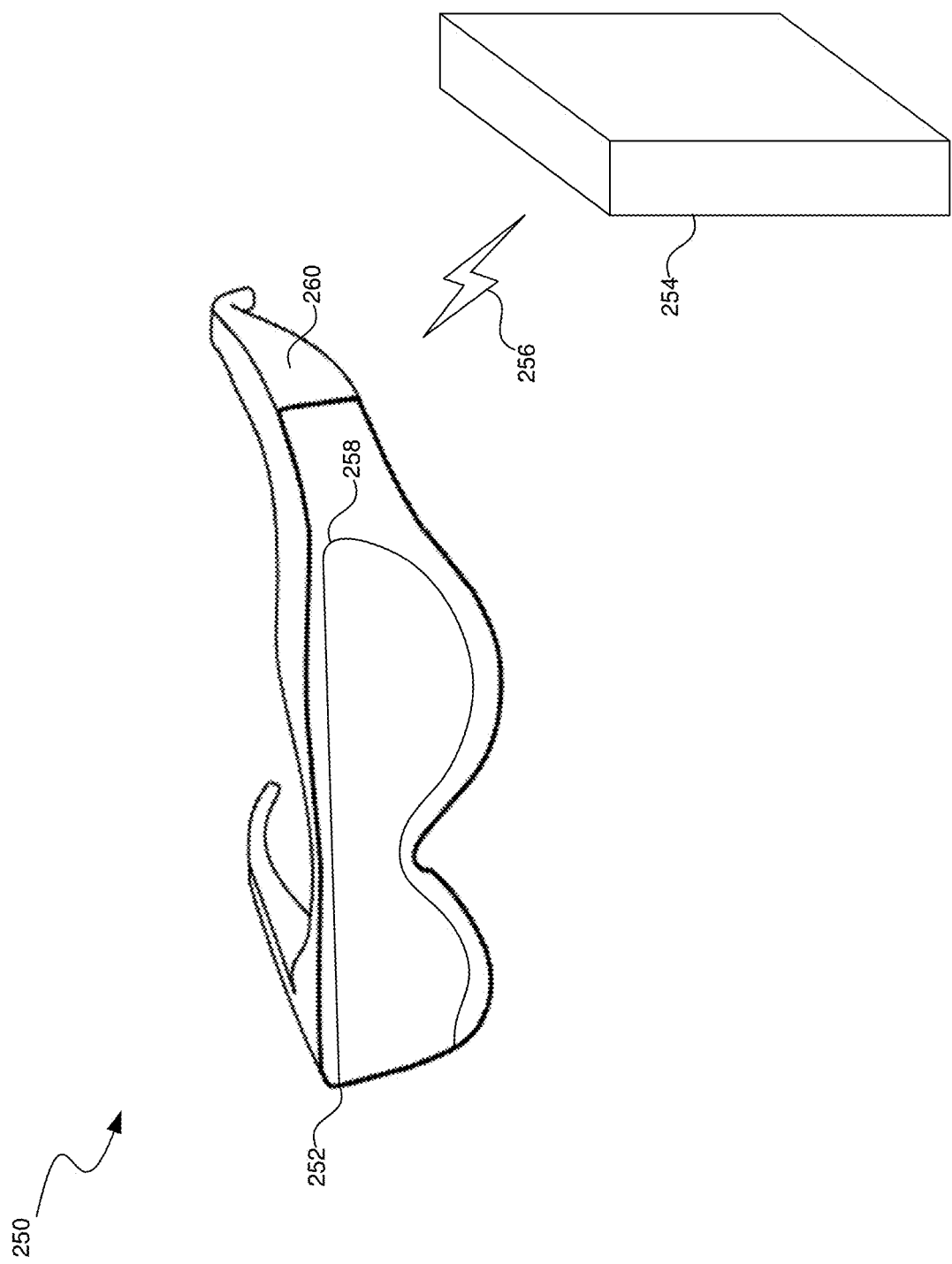
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
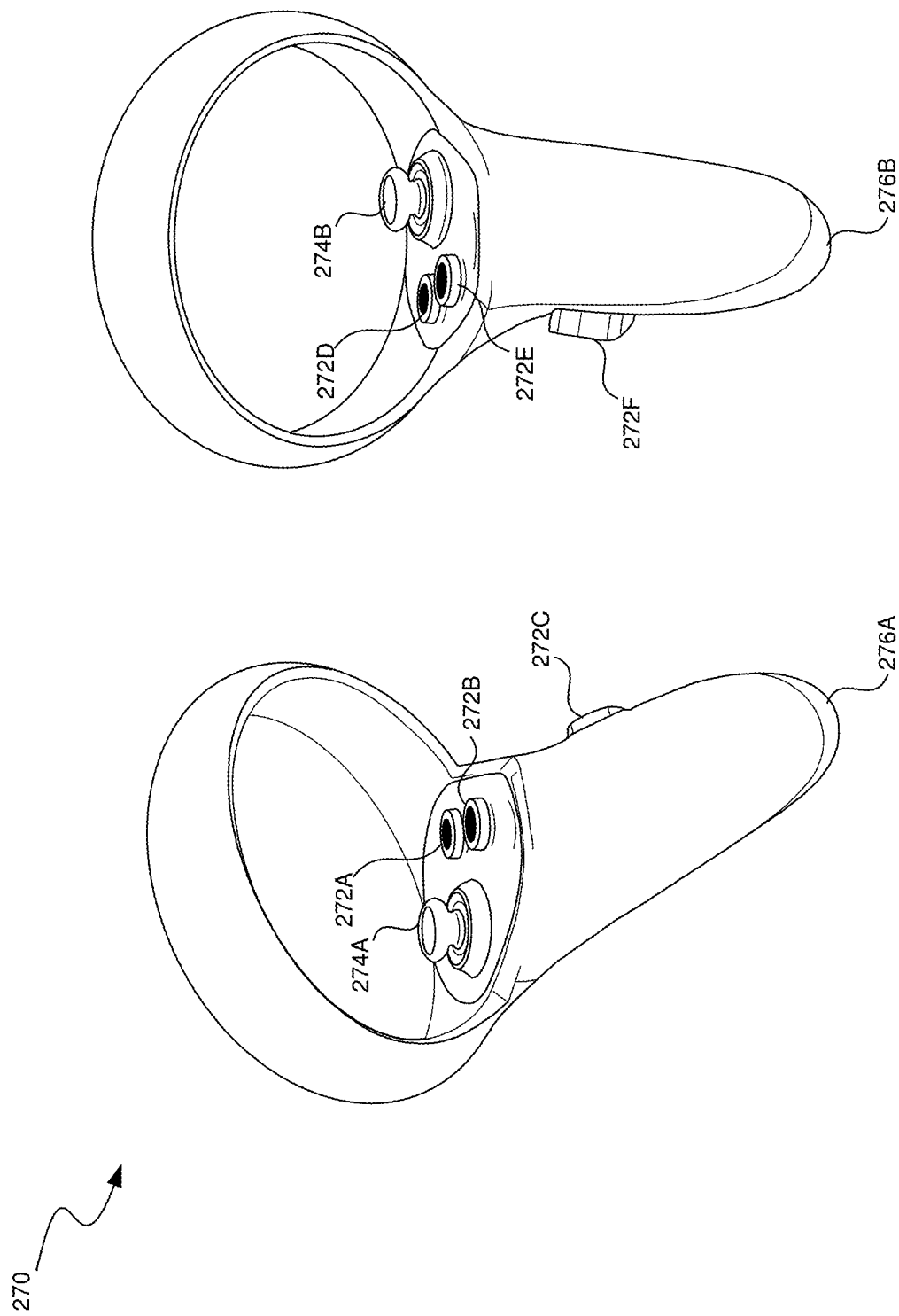
FIG. 2C is a wire diagram illustrating controllers which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
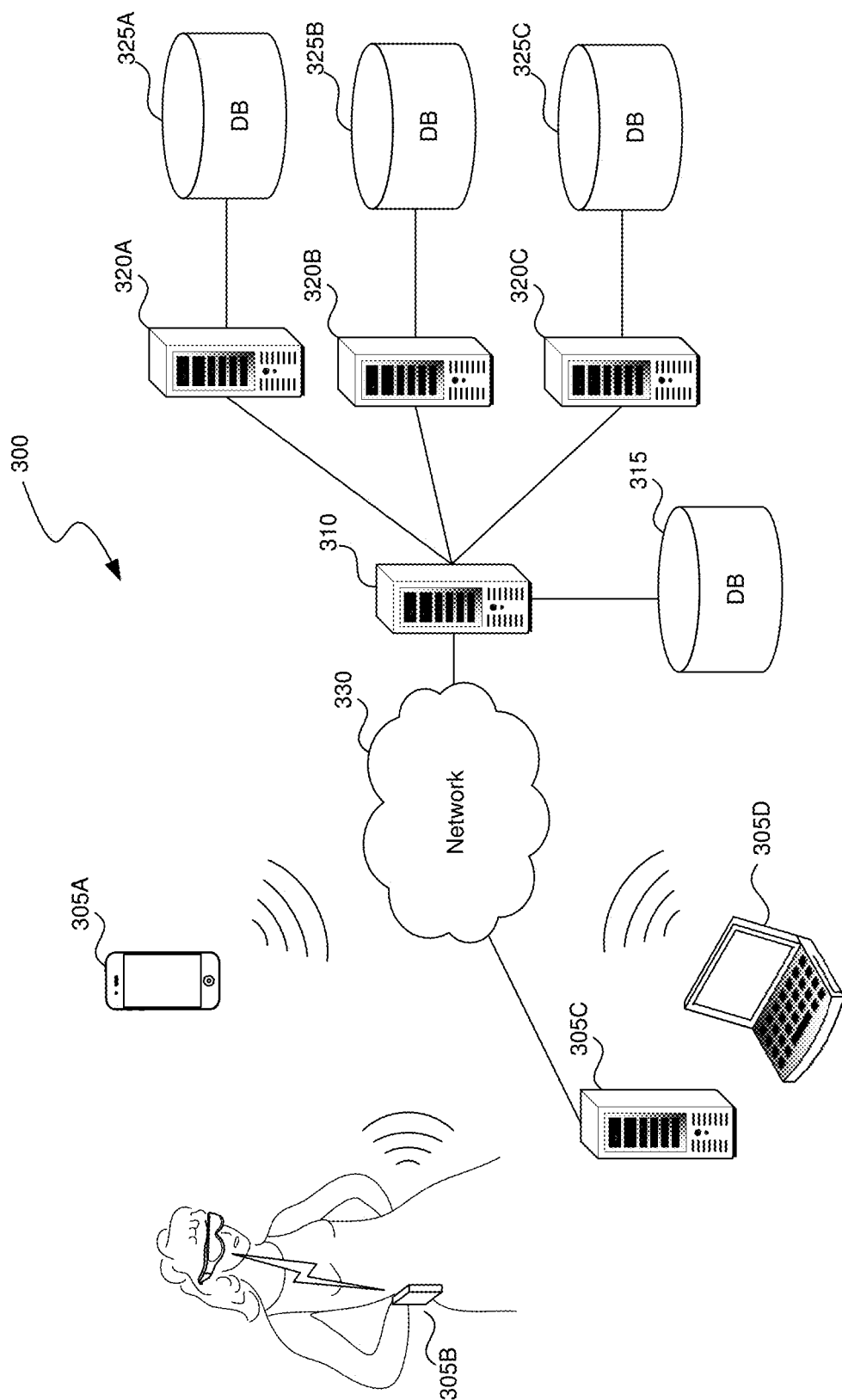
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media, hi various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their personalized avatar) with objects or other avatars in a virtual environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 4:
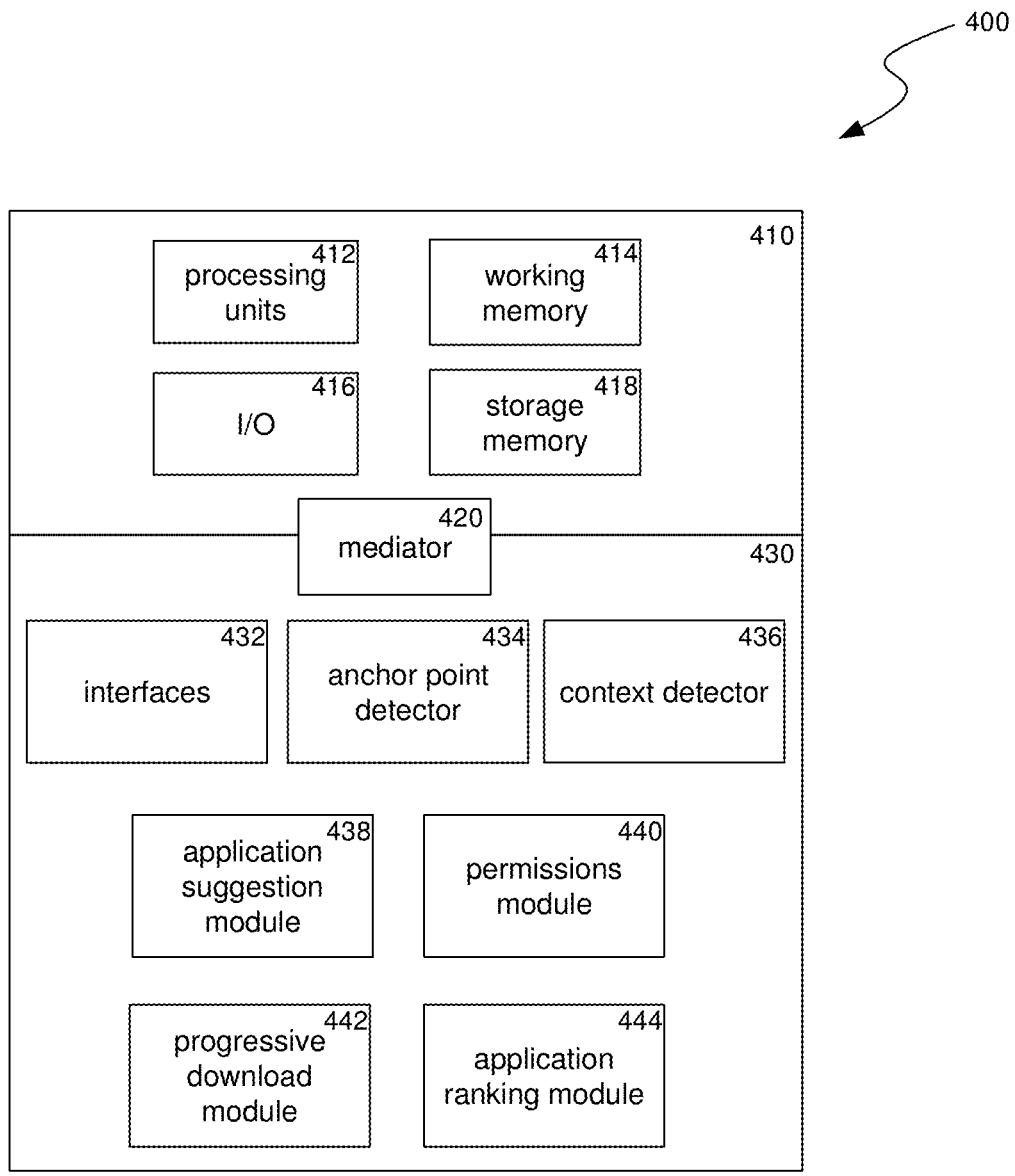
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for suggesting and controlling applications in an artificial reality environment. Specialized components 430 can include anchor point detector 434, context detector 436, application suggestion module 438, permissions module 440, progressive download module 442, application ranking module 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Anchor point detector 434 can identify artificial reality environment anchor points. Anchor points can be individual points, a 2D surface, or a 3D volume. In some cases, anchor points can correspond to an identified object, surface, type of object, or type surface. Additional details on identifying artificial reality environment anchor points are provided below in relation to block 502 of FIG. 5.

Context detector 436 can determine a current context for an XR device. The current context can include data determined by sensors of the XR device (either directly or via further processing such as with trained machine learning models, heuristics, etc.), retrieved from third party sources (e.g., news feeds, social media platforms, weather services, etc.), or local data (e.g., logs of user events, communications, activities, etc.) The context can include features for a user context (e.g., user activity/posture, location, social graph connections to nearby users, calendar events for the user, known user routines, whether the user in a conversation, where user has been looking, user set preferences, etc.) and/or for an artificial reality environment context (e.g., surfaces and objects in the artificial reality environment, current time, scene tags such as noisy, crowded, etc.) Additional details on identifying a context are provided below in relation to block 504 of FIG. 5 and block 906 of FIG. 9.

Application suggestion module 438 can identify one or more applications that match the anchor(s) identified by anchor point detector 434 and/or that match the context identified at context detector 436. This matching can be by one or more of: A) comparing a set of anchor point types defined for an application to types of identified anchor points, B) comparing a set of context features mapped to an application to current context features, and/or C) applying a machine learning model trained to determine a match score between application features and context features and/or anchor points. Once matches are made, additional rules can be applied, such as limiting whether multiple applications of the same type are in the top matches. The resulting matching applications can be suggested to the user. Additional details on providing context-specific application suggestions are provided below in relation to blocks 506 and 508 of FIG. 5.

Permissions module 440 can identify that a user has provided an action in relation to one or more of the applications suggested by application suggestion module 438 and, in response, can set permissions for the authorized application(s), such as permissions to write augments into a new space, provide notifications, access input signals, receive context features, perform authentications, share or message with other users or write into a shared XR space, exchange objects or other data with other authorized applications, etc. Permissions module 440 can also receive explicit or implied permissions changes from a user (e.g., based on whether the user has interacted with a threshold amount of augments provided by an application or application type) and, in response, can remove application permissions. Additional details on setting and updating application permissions are provided below in relation to block 512 of FIG. 5, and FIGS. 7 and 8.

Progressive download module 442 can identify a trigger for application augment creation or other output, where the application is not fully resident on the XR device and can determine a priority order for application component downloads, based on the triggered aspects of the application. Progressive download module 442 can then begin download of those application components according to the priority order. Additional details on progressive download of application components are provided below in relation to FIG. 6.

Application ranking module 444 can identify when multiple applications are simultaneously authorized to execute in an artificial reality environment, and in some cases on the same anchor points and can employ a ranking system to limit the amount of augments that can be anchored to a particular surface, object, within a physical space, and/or within an area in the user's field of view. Ranking module 444 can define rankings among the applications that can write to a given anchor or area, where the rankings can account for a current context from context detector 436. With the application rankings, and in some cases additional rules for allowing application output, ranking module 444 can select threshold amounts of output from highest ranking applications for output to anchors and spaces. Additional details on ranking applications for prioritized output are provided below in relation to FIG. 9.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
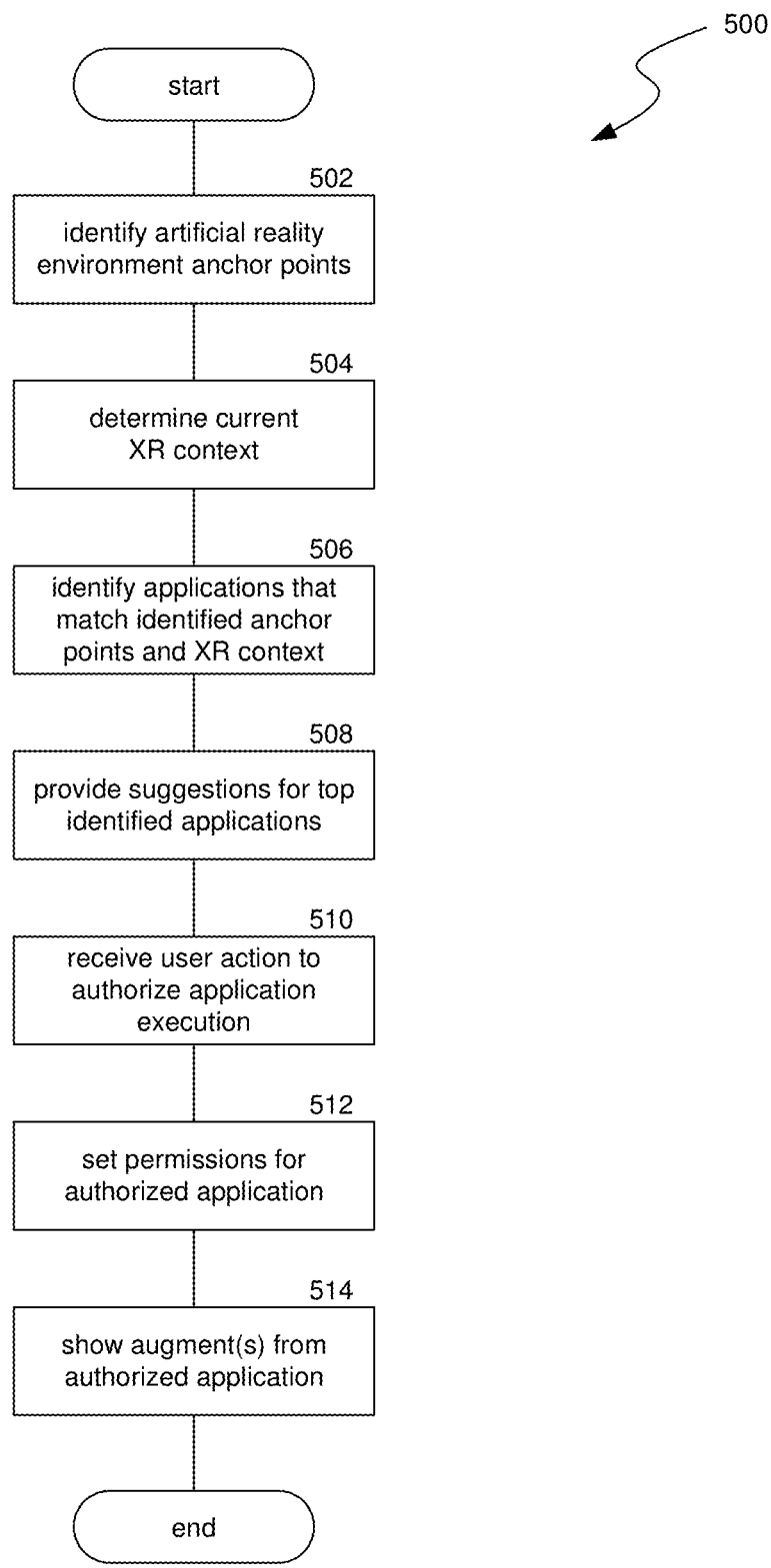
FIG. 5 is a flow diagram illustrating a process used in some implementations of the present technology for providing context-based application suggestions and recognizing a user action as an authorization for a suggested application.

FIG. 5 is a flow diagram illustrating a process 500 used in some implementations of the present technology for providing context-based application suggestions and recognizing a user action as an authorization for a suggested application. Process 500 can be performed to suggest one or more "ambient" applications, which appear to the user as applications that are always on without having to manually find, download, and install, the application. In some implementations, process 500 can be performed on an XR device, e.g., as a user moves about an artificial reality environment. In other implementations, process 500 can be performed on a server system supporting the XR device, e.g., with input from the XR device specifying sensor data such as color and depth images, SLAM data, IMU data, etc. In some cases, process 500 can be performed periodically, e.g., every second or fraction of a second to suggest applications or can be performed in response to triggers such as a certain amount of movement of the XR device or an identified change in objects in the XR device's artificial reality environment.

At block 502, process 500 can identify artificial reality environment anchor points. Anchor points can be individual points, a 2D surface, or a 3D volume. In some cases, anchor points can correspond to an identified object, surface, type of object, or type surface. For example, if an artificial reality application system identifies that a user is walking down a grocery store isle with food items, recognized food items can become anchor points. As another example, the artificial reality application system can identify a surface type by determining a flat plane of a particular size and orientation, such as identifying a wall surface by determining a flat plane that is vertical and at least twelve square feet.

At block 504, process 500 can determine a current XR context. The XR context can include any data determined by sensors of the XR device (either directly or via further processing such as with trained machine learning models, heuristics, etc.), retrieved from third party sources (e.g., news feeds, social media platforms, weather services, etc.), or local data (e.g., logs of user events, communications, activities, etc.) For example, the current XR context can include one or more of: identified objects and/or surfaces around the user, current location data for the user (e.g., GPS data and/or SLAM data), user state (emotion, posture/gestures, gaze direction), relationship to other users in the area (e.g., their presence, their actions, their relationship to the current user on a social graph), known events or calendar items for the user, recent messaging activity of the user, user preferences, current time or date, current lighting, weather or other environment conditions, identified sounds in the environment, etc.

At block 506, process 500 can identify one or more applications that match the anchor(s) identified at block 502 and/or that match the XR context identified at block 506. In various cases, applications to be matched with the XR context and/or anchor point can be locally installed on the XR device, can be from an "app store," can have been indicated by another user (e.g., shared in a chat session or otherwise sent to the current user), can have been tagged to the user's current location (e.g., an owner of an establishment can provide an application for user in that residence), etc.

An application can specify a set of anchor point types for which it can supply content and the application can match an anchor point when the type of the anchor point is in the set of specified anchor points for that application. In some implementations, particular sets of context features can be mapped to an application to determine a match between a context and the application. For example, an application creator or administrator can register the application for a set of contextual features such as the object types or locations for which the application is configured to provide output, context features with which other users have used the application, or contexts for which users have recommended the application. In other implementations, a machine learning model can be trained to determine a match score between features of a context (e.g., provided as values in a sparse vector) and a specified application or type defined for the application (e.g., transportation mapping application, photo gallery application, etc.) Such a machine learning model, (e.g., a neutral network), can be trained on training items that are created by matching examples of a user manually selecting an application to use with a current context. For example, when a user is in a context of walking down a city street and the user opens the map application, this context/application pair can be provided as a positive training item. Other installed application that were not selected can be paired with the context as negative training items. In some cases, a match occurs only when there is a match between the application and both the XR context and the anchor point. In other cases, a match occurs when the application matches to either the anchor point or context. In yet further cases, process 500 may only determine whether one of the anchor point or XR context is a match with applications. In some cases, a match can include a match score—i.e., how well the context and/or anchor point align with the specified set of anchor points and/or context features for the application. For example, the machine learning model trained to determine a match can produce the match score.

At block 508, process 500 can provide application suggestions for one or more of the matches that have the top match scores. In some implementations, suggestions can be provided as overlays in an artificial reality environment, e.g., as a list of suggested applications positioned relative to the determined anchor point matched to the suggested application. For example, if a user's field of view includes a particular kind of car identified as an anchor point and the matched application with the highest match score is an automobile sales application, an indication (e.g., icon) of the automobile sales application can be positioned next to the car. In various implementations, a number of application suggestions can be provided, such as one, two, or three; only applications with a match score above a threshold can be provided; and/or application suggestions can be provided according to an amount of room determined for a suggestion area. For example, an area next to an anchor point can be designated for augments and suggestion can be made while this area is not full with other suggestions or with augments that previously authorized applications have written to that area. In another example, there may be a limit on the amount of the user's field of view that can be taken up by augments, preventing the user from being overwhelmed by augments written into her environment.

In some cases, the applications can have assigned categories, and a limited amount of applications from a category (e.g., those with the highest match scores in that category) are shown. For example, if there are five matching applications—a mapping category application A with a match score of 0.95, a special offer category application B with a match score of 0.83, a special offer category application C with a match score of 0.79, a mapping category application D with a match score of 0.72, and a game category application E with a match score of 0.71—where three applications can be suggested, the first mapping category application A can be suggested due to its match score of 0.95, the first special offer category application B can be suggested due to its match score of 0.83, the next two special offer category and mapping category applications C and D can be skipped because an application from each of these categories was already selected, and the game category application E with the match score of 0.71 can be suggested.

At block 510, process 500 can receive a user action to authorize execution of one or more of the applications suggested in block 508. Examples of such user actions include dragging the indication of the application out of the suggestion area, tapping the indication of the suggested application, providing a voice command indicating the suggested application, opening a dialog control to approve the application, etc.

At block 512, process 500 can set permissions for the application(s) authorized at block 510. Applications can have various permissions such as to write augments into a new space, provide notifications (e.g., when the application is otherwise inactive), access input signals (e.g., from a XR device camera, microphone, etc.), receive context features (e.g., user status, surrounding objects, third-party data, etc.), perform authentications (e.g., logging into other systems, accessing payment platforms, etc.), share or message with other users or write into a shared XR space, exchange objects or other data with other authorized applications, etc. The permissions set for an application can be a standard set of permissions for user-authorized applications or permissions to provide output for the anchor point or anchor point type from block 502, when a threshold amount of context features from block 504 (e.g., those that were the cause of the match at block 506) exist, or general permissions to perform a set of actions specified by the application (e.g., where the set of actions are presented to the user for authorization as part of the user authorization action of block 510).

At block 514, process 500 can allow the application authorized at block 510 to show augments or provide other output according to the permissions set at block 512. In some cases, the application can provide the augment or other output in relation to the user action from block 510. For example, if the user action was to pull the indication of the application out of the suggestion area into her environment, an augment created by the authorized application be placed where the user dropped the indication of the application. In some cases, the application can provide the augment or other output in relation to aspects of the matched context (from block 506) and/or anchor point (from block 502). For example, an augment created by the authorized application can at the anchor point (e.g., at a particular point, on a particular surface, in a particular volume, etc.) and/or can be placed in relation to the location of objects or events that were matched (e.g., if the matched context included identifying a particular object, the authorized application can write to an augment that encapsulates that object). In some cases, an authorized application may only have permissions to provide output in certain circumstances which may not currently exist or may not provide visual output at all, but feedback such as an animation or sound can be provided to signal to the user that her attempt to activate the application was successful.

In some cases, when an application is triggered to provide output such as at block 514, the application may not be fully resident on (i.e., have all its components downloaded to) the XR device. However, applications can be divided into multiple components which can be progressively downloaded to provide the output before the application is fully resident. This can be accomplished using the prioritization process for progressive download discussed below in relation to FIG. 6.

Figure 6:
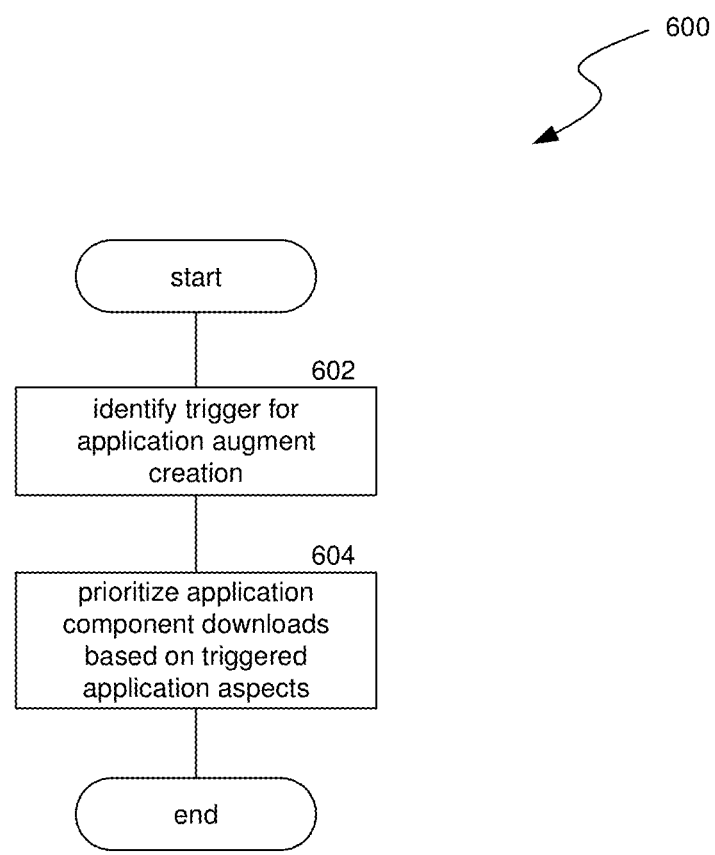
FIG. 6 is a flow diagram illustrating a process used in some implementations of the present technology for progressive download of application components.

FIG. 6 is a flow diagram illustrating a process 600 used in some implementations of the present technology for progressive download of application components. In some implementations, process 600 can be performed on a XR device. Process 600 can be performed in response to execution of an application which is not fully resident on the XR device. For example, process 600 can be performed as a subprocess of process 500, e.g., at block 514. Applications can be divided into components (e.g., data source, instance, presenter, augments, visual elements, action scripts, etc.) and process 600 can download the necessary components and hydrate content as needed. This allows the applications to execute as needed without the user having to wait until the application is fully resident before being able to use parts of it. This also provides an "always on" feeling to applications, letting the user not worry about whether an application is installed or even if it's local or remote. This can also save storage space, allowing unused applications or application components to be discarded when space is low, and re-downloaded as needed.

At block 602, process 600 can identify a trigger for application augment creation or other output, where the application is not fully resident on the XR device. While any event can trigger an application output, examples of such triggers include the XR device recognizing an object for which the application has registered, a timer expiring, a user action indicating the application, etc.

At block 604, process 600 can determine a priority order for application component downloads, based on the triggered aspects of the application, and begin the download of those application components. The triggered aspects of the application are those that will be used to provide the output in response to the trigger identified at block 602. For example, if certain scripts or visual elements are needed to create content for an augment that respond to the trigger, these components can be prioritized ahead of other components that may not be needed to respond to the trigger. In some cases, visual elements can be prioritized ahead of those that may respond to further actions of the user. For example, an augment can be created with its visual elements, with the assumption that a user may not immediately interact with the augment, allowing the system time to download the active programming elements in the interim between when the augment is displayed and when the user begins interacting with it. In some cases, some of the visual elements can be initially downloaded at a lower resolution and displayed quickly, and then replaced later as higher resolution versions are downloaded. In some instances, application components can be groups into batches according to when they are expected to be needed. For example, an initial set of visual components can be put in a first batch and programming elements can be put in a later batch. Each batch can be downloaded together, with the next batch starting when the previous one is complete.

Figure 7:
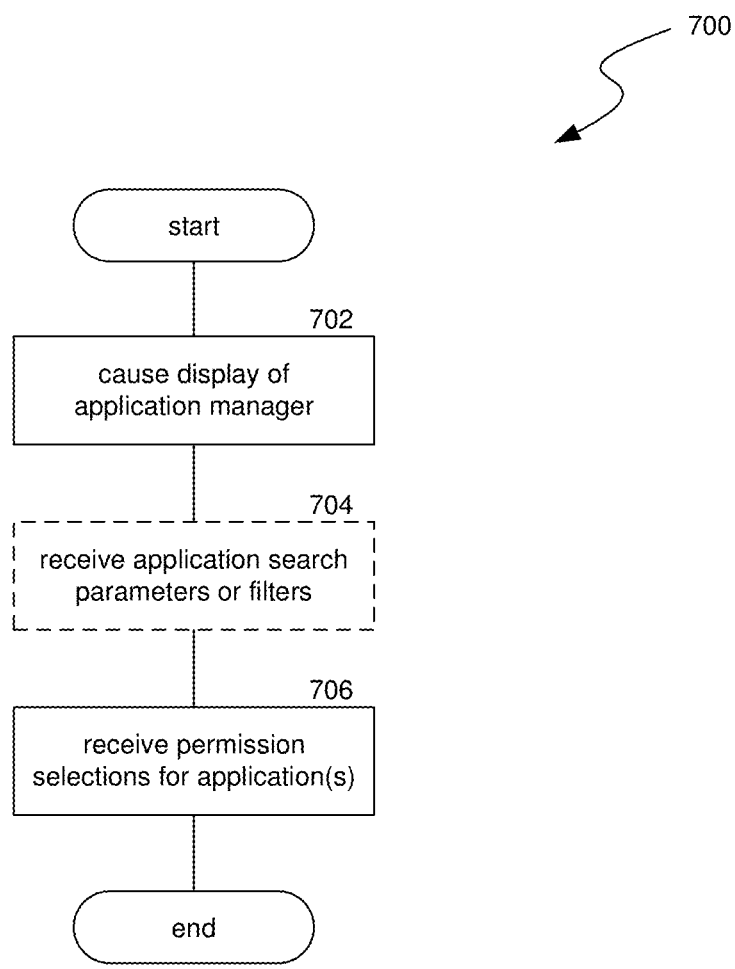
FIG. 7 is a flow diagram illustrating a process used in some implementations of the present technology for controlling application permissions via an application manager.

FIG. 7 is a flow diagram illustrating a process 700 used in some implementations of the present technology for controlling application permissions via an application manager. In various implementations, process 700 can be performed on an XR device or on a remote supporting system (e.g., server) that is in control of application permissions for the XR device. Process 700 can be triggered by various user actions to access application permission controls such as by activating a UI control, speaking a command, performing a gesture, etc. In some cases, the user action (e.g., by opening a menu and selecting an application manager control) can be mapped to access a general application manager while other actions (e.g., performing a long-pinch gesture) on an augmented created by an particular application or a displayed representation of the particular application can be mapped to access a sub-section of the application manager for the particular application.

At block 702, process 700 can cause the application manager (or sub-section thereof corresponding to an indicated application) to be displayed. The application manager can include controls allowing a user to make specific selections as to what permissions the listed applications are assigned. In some cases, the permissions control can be a single enabled/disabled button, which when switched to disabled prevents an application from providing any output. An example of such an application manager is provided in FIG. 12. In some implementations, the permissions controls can include more fine-grained controls over individual permissions such as to write augments into a new space, provide notifications (e.g., when the application is otherwise inactive), access input signals (e.g., from a XR device camera, microphone, etc.), receive context features (e.g., user status, surrounding objects, third-party data, etc.), perform authentications (e.g., logging into other systems, accessing payment platforms, etc.), share or message with other users or write into a shared XR space, exchange objects or other data with other authorized applications, etc. In some cases, the application manager can include both, where there is a general enable/disable control for each application and a way to drill down in the selections to set individual permissions.

As discussed above, any block can be removed or rearranged in various implementations. However, block 704 is shown in dashed lines to indicate there are specific instances where block 704 is skipped. At block 704, process 700 can receive user selections of search parameters or filters for the applications listed in the displayed application manager. For example, the applications can be tagged with various meta-data such as application types, keywords, user rankings/reviews, when the application last provided output to the current user, a frequency of output by this application, types of output provided by the application, types of objects or events the application has registered to receive, etc. Through various controls and selections, a user can indicate which of these meta-data to search for, sort by, and/or filter the list of applications by.

At block 706, process 700 can receive one or more permissions selections for listed applications. These permissions selections can be through activation of the controls displayed at block 702, such as to enable/disable an application or to set particular permission for an application. In some implementations, the permissions selections can register or de-register an application for objects and events the application can control or be made aware of. For example, the application manager can provide a list of such objects or events that an application has registered for, and the user can provide selections to remove the registrations or provide new ones. In some cases, the permissions selections can be accompanied by rules or that define when the selection is to take effect and/or when the permissions selections expire. For example, users can set a mute timer or trigger for a disabled application, allowing the disabled application to be re-enabled when the timer expires or the event occurs. As a more specific example, a rule can be setup to disable an application in a particular location, when an event occurs on the user's calendar, or when the XR device determines the user is engaged in a live conversation, and the rule can specify to re-enable the application when the user is no longer at the location, the calendar event ends, or the live conversation ends. Following the selections, process 700 can set permissions for applications according to the received permissions selections. For example, upon deactivation of an application, all augments that were created by that application can be closed and the application may longer have permissions to create augments in the artificial reality environment. In some cases, a deactivated application may be uninstalled, either immediately or as storage space on the XR device is needed.

Figure 8:
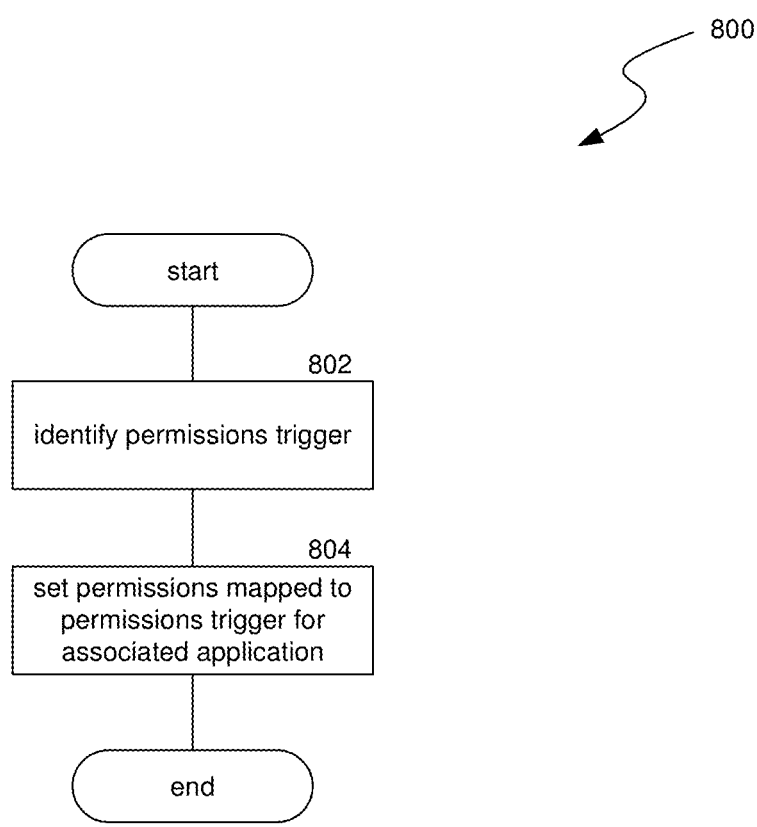
FIG. 8 is a flow diagram illustrating a process used in some implementations of the present technology for controlling application permissions in response to a context.

FIG. 8 is a flow diagram illustrating a process 800 used in some implementations of the present technology for controlling application permissions in response to a context. In various implementations, process 800 can be performed on an XR device or on a remote supporting system (e.g., server) that is in control of application permissions for the XR device. Process 800 can be executed by a control system of the XR device, e.g., upon startup of the XR device, periodically (e.g., every 0.1-3 seconds), or when certain events occur such as an identified change in a current context (e.g., when the XR device has determined it has moved a threshold amount, when a new object enters the artificial reality environment, when new third-party data comes in, etc.)

At block 802, process 800 can identify a permissions trigger. In some cases, the permissions trigger can be one or more events or other contextual factors (e.g., recognized user state, recognized object in the artificial reality environment, condition identified in third-party data, etc.) that have been mapped to a permissions change. For example, application permissions can be set that cause the application to mute (i.e., pause providing output) when it's determined that a user is in a conversation, is driving, is at work, etc. In other cases, the permissions trigger can be an identified user intent to disable or mute an application. Such an intent can be inferred from user actions such as the user closing or not interacting with a threshold amount (e.g., number, percentage, etc.) of augments generated by the application within a threshold time window (e.g., in the past day or week). For example, if an application produced ten augments in the past day, but the user interacted with only two of them, which is less than a 40% threshold in the one day time window, then that application can be muted. As another example, if the application produced 75 augments in the past week, but the user interacted with only six of them, which is less than a 15% threshold in the one week time window, then that application can be disabled. In some cases, user intents can be identified for a type of application, such as by identifying if a user ignored or closed augments from a type of application within a time window, even though the augments came from different applications of that type. In some implementations, when a user intent is identified, the intent can be confirmed with the user (e.g., through a dialog of "Do you want to disable the MapStar application?" or "Do you want to disable all instant messaging applications?")

At block 804, process 800 can set permissions mapped to the permissions trigger, identified at block 802, for the associated application(s). Each permissions trigger can be mapped to a corresponding action, such as muting or disabling an application, which can be implemented for the application (or set of applications in the type) corresponding to the permissions trigger. In various implementations, the permissions change can be for the application(s) generally or may only be made for a context in which the permissions trigger occurs. For example, if the permissions trigger is that a user has disable a threshold number of nutrition suggestions while in a supermarket, and the permissions change is to mute the application, the permissions change can be implemented so that the nutrition suggestions only are muted in supermarkets but not other contexts, such as when the user is looking in her fridge. Following the permissions change, process 800 can end until its next execution.

Figure 9:
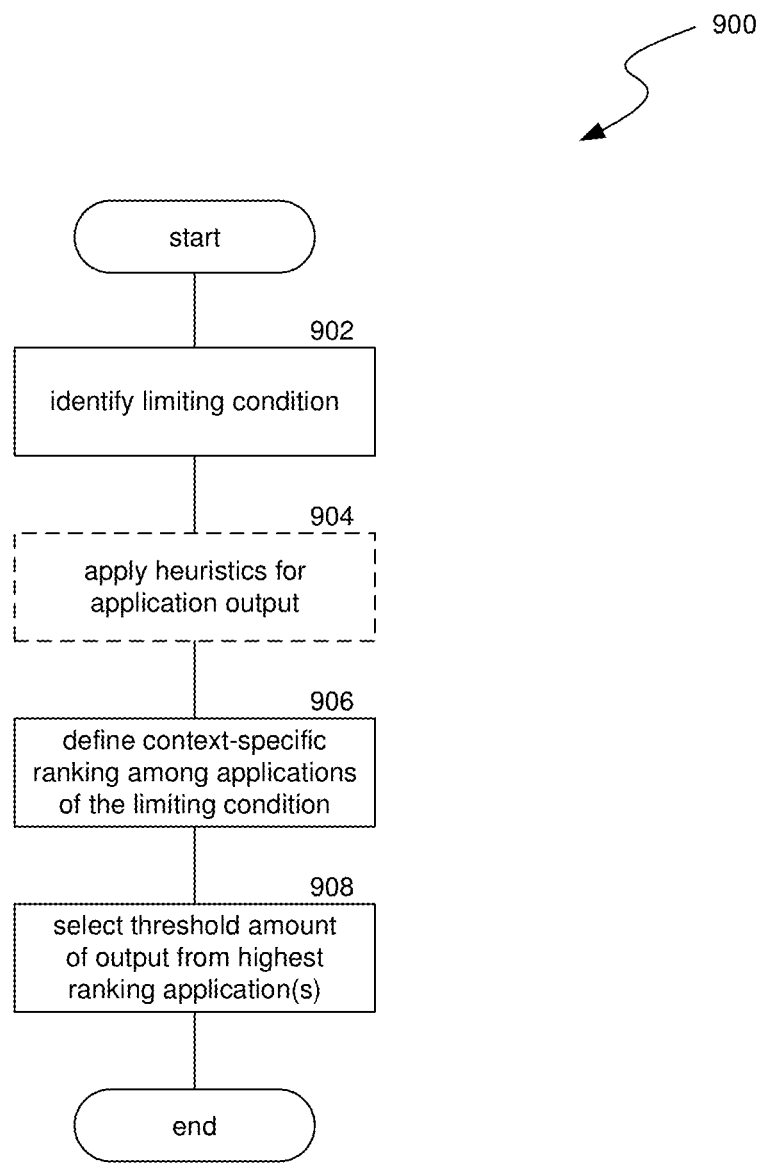
FIG. 9 is a flow diagram illustrating a process used in some implementations of the present technology for prioritizing application output through a context-specific ranking.

FIG. 9 is a flow diagram illustrating a process 900 used in some implementations of the present technology for prioritizing application output through a context-specific ranking. In various implementations, process 900 can be performed on an XR device or on a remote supporting system (e.g., server) that is in control of application output for the XR device. Process 900 can be executed by a control system of the XR device, e.g., upon identifying an event or object that multiple applications have each registered to receive notification of and have requested an augment space in relation to.

At block 902, process 900 can identify a limiting condition for application output. In some implementations, an XR device can be configured to limit the number of augments or area taken up by augments, either as a limit on augments within any give area of the user's field of view or as a limit on augments that can be attached to a particular object or other anchor point. In various cases, different limits can be set for different types of objects (e.g., based on the objects prominence in the user's field of view) or anchor points (e.g., based on the anchor point type (point, surface, volume), size, or established layout). For example, when three applications request an augment anchored such that they would be overlapping or within a threshold distance of one another in the user's field of view, process 900 can identify this as a limiting condition. As another example, when two applications request an augment anchored to the same object, process 900 can identify this as a limiting condition.

As discussed above, any block can be removed or rearranged in various implementations. However, block 904 is shown in dashed lines to indicate there are specific instances where block 904 is skipped. At block 904, process 900 can apply heuristic rules for limiting application output. While a variety of such rules can be defined, examples include: rules to limit how many applications of the same type can concurrently provide output (or output on the same object or within a threshold distance of one another), rules to specify types or configurations of augments that can be attached to certain types of object, user specified preferences on application output limits, etc.

At block 906, process 900 can define a context-specific ranking among the applications that were involved in the identification of the limiting condition at block 902. The context specific ranking can be computed by a machine learning model trained to match an application to a context, where features of the context are provided to the model (e.g., as a sparse vector) along with an identification of the application or tags describing the application (e.g., application type, types of application output, application uses, etc.) and the model produces a score defining how well the application matches the context. Such a machine learning model (e.g., a neutral network) can be trained on training items that are created by matching examples of a user manually selecting an application or interacting with a created augment (e.g., performing a gesture in relation to an augment, having the user's gaze rest on the augment for above a threshold time) to use with a current context. For example, when a user is in a context of walking down a city street and the user opens the map application, this context/application pair can be provided as a positive training item. Other installed applications that were not selected can be paired with the context as a negative training item. As another example, when a user is in a context and an application creates and augment that the user then interacts with (e.g., using a grab gestures to look at it from multiple angles,) this pair of the context and creating application can be provided as a positive training item.

In various implementations, the context can include features for a user status, such as user movement/posture, location, social graph connections to nearby users, calendar events for the user, known user routines, whether the user in a conversation, where user has been looking, user history with applications (e.g., user interaction or focus time above a threshold time with augments from an application), user-set preferences, etc. The context can also include data determined by sensors of the XR device, either directly or via further processing such as with trained machine learning models, heuristics, etc. (e.g., surfaces and objects in the artificial reality environment, current time, scene tags such as noisy, crowded, etc.) The context can also include data retrieved from third party sources (e.g., news feeds, social media platforms, weather services, etc.) or local data (e.g., logs of user events, communications, activities, etc.)

At block 908, process 900 can select a threshold amount of output from the application(s) ranked highest at block 908. In some implementations, the threshold amount of output can be based on an amount of output allowed by the limiting condition identified at block 902. For example, there can be a threshold number of augments that can be attached to an object or there can be a designated area or surface that applications can output to, and output can be selected from the highest ranking applications until the maximum number is reached or that area is full. As additional examples, the threshold amount can be an amount of the user's field of view that augments can take up or a maximum density of augments that can be put in a given portion of the user's field of view. In some cases, the selection of the highest ranking applications can be based on the heuristics from block 904. For example, a rule can specify that, for a given object, only a single augment from the same type of application can be attached, and that the limiting condition can specify that only two augments can be attached to the object. Thus, in this example, if the top two scoring applications are mapping applications and the third scoring application is a local history application, the top scoring mapping application can attach an augment to the object and the local history application will be given the second augment slot as the second mapping application is precluded by the rule. Process 900 can repeat as the context changes and additional limiting conditions are identified.

Figure 10:
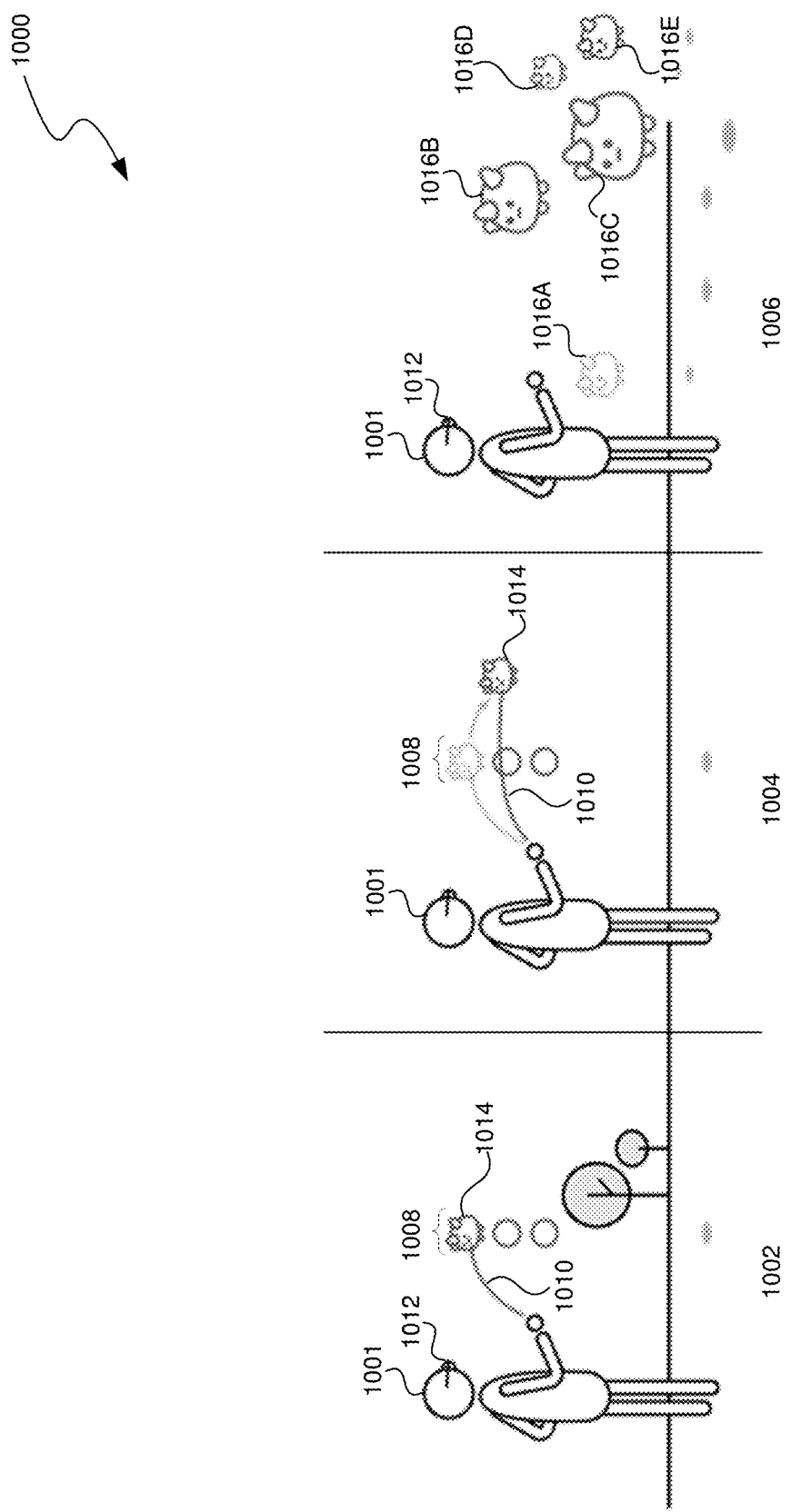
FIG. 10 is a conceptual diagram illustrating an example of a user receiving application suggestions, peeling a suggestion to enable the application, and viewing augments from the enabled application.

FIG. 10 is a conceptual diagram illustrating an example 1000 of a user 1001 receiving application suggestions (in frame 1002), peeling a suggestion to enable the application (in frame 1004), and viewing augments from the enabled application (in frame 1006). In frame 1002, user 1001 is wearing XR device 1012, which has identified and anchor point and a context and selected applications to suggest, indications of which are shown to the user 1001 at 1008. The user casts a virtual ray 1010 at application indication 1014. In frame 1004, user 1001 moves virtual ray 1010 to drag the indication 1014 out of the suggestion area 1008 and into the artificial reality environment. This causes progressive download of the components for the applications corresponding to indication 1014 and sets permissions for this application to be able to create augments in the artificial reality environment. In frame 1006, the application exercises these permissions to write augments 1016A-1016E into the artificial reality environment, which the user 1001 views via the XR device 1012.

Figure 11A:
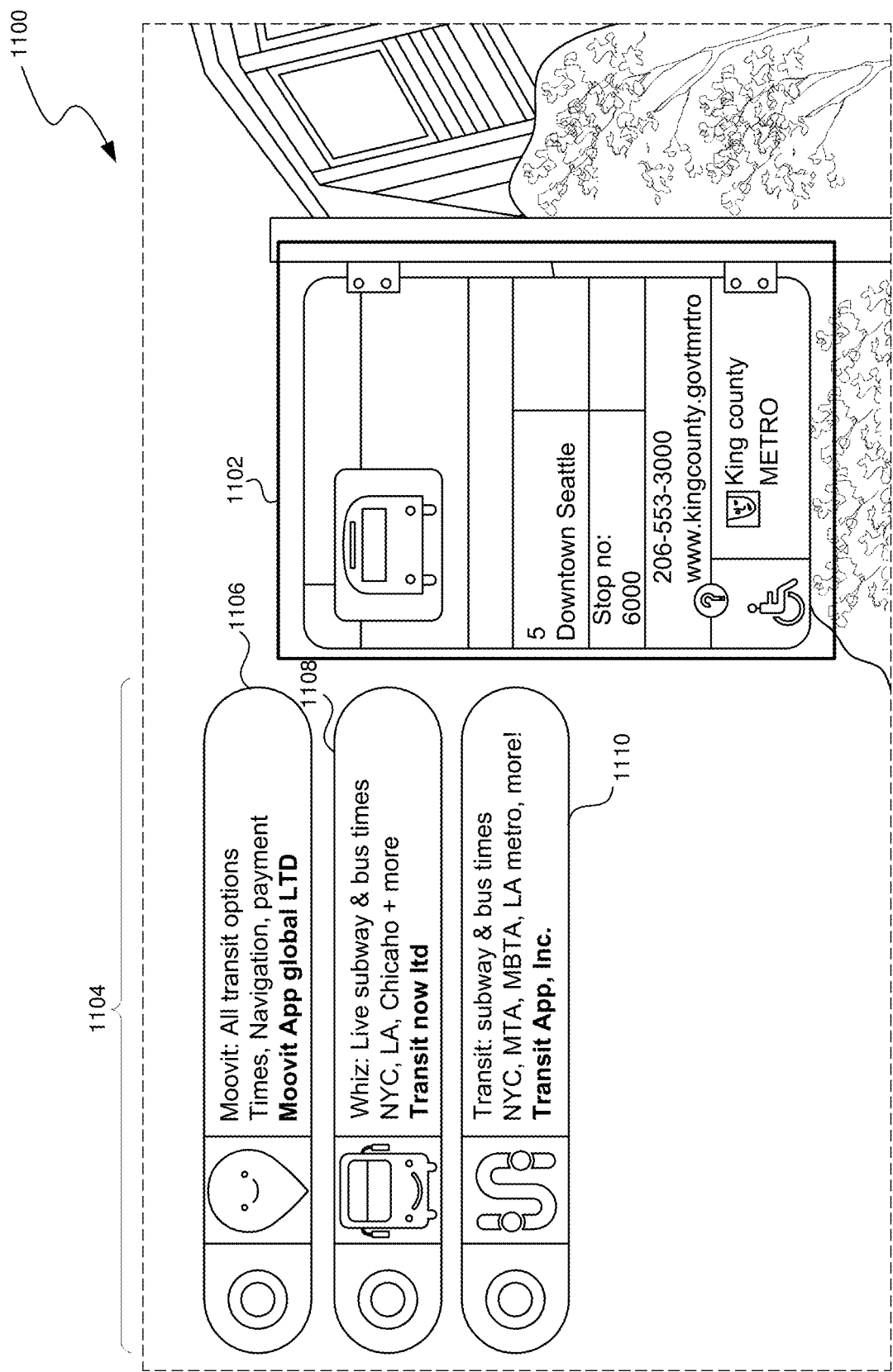
FIG. 11A is a conceptual diagram illustrating an example of receiving application suggestions for a context.
Figure 11B:
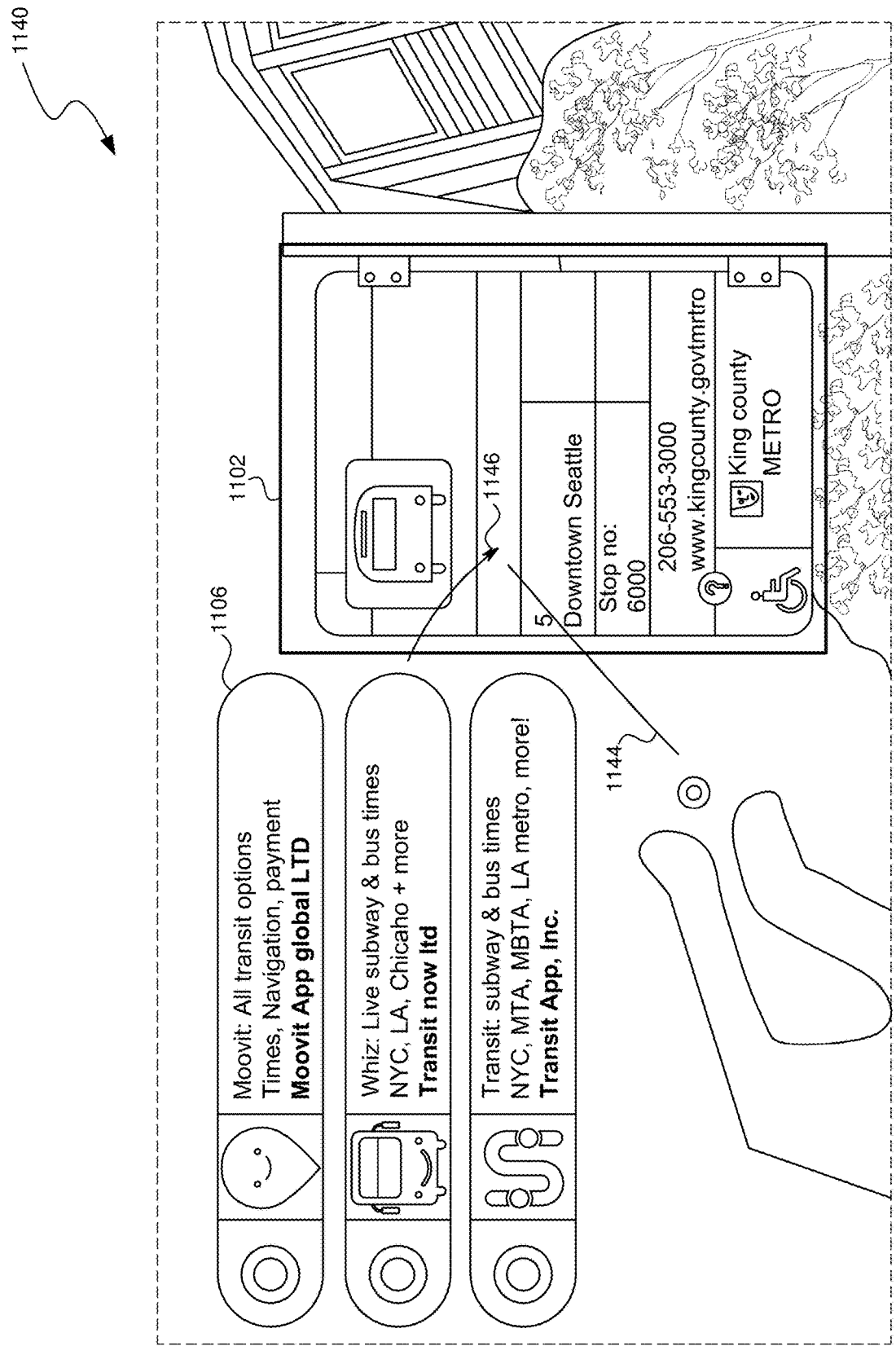
FIG. 11B is a conceptual diagram illustrating an example of receiving authorization for a selection of a suggested through a drag gesture.
Figure 11C:
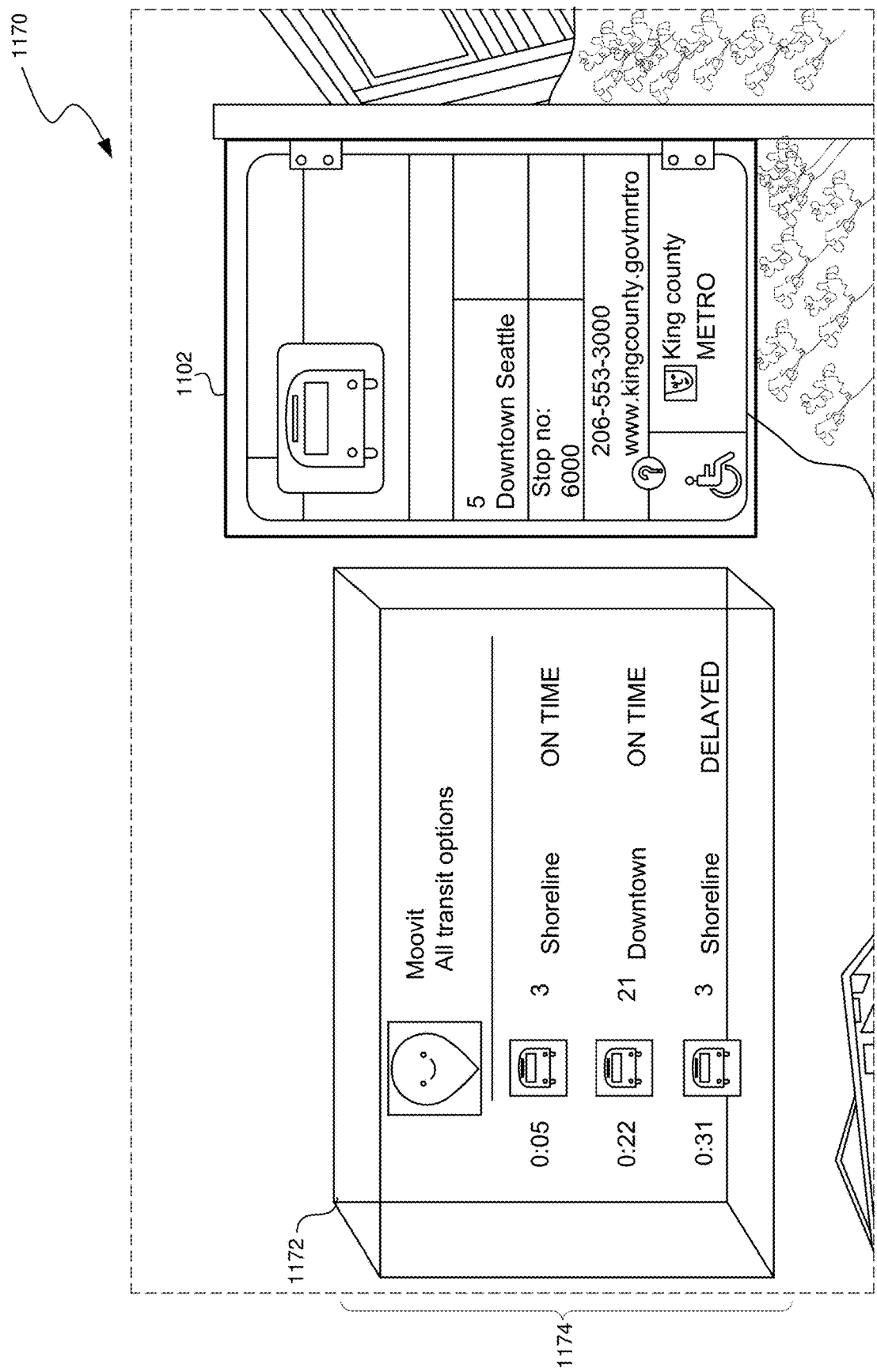
FIG. 11C is a conceptual diagram illustrating an example of an authorized application generating an augment in relation to a context.

FIGS. 11A-11C illustrate examples or the field of view provided by an XR device while receiving application suggestions, peeling a suggestion to enable the application, and viewing an augment from the enabled application. FIG. 11A is a conceptual diagram illustrating an example 1100 of receiving application suggestions for a context. In example 1100, the XR device has recognized that the user's gaze has lingered on an object identified 1102 as a transportation sign. The XR device has added a border around the recognized object 1102—signifying that this is the anchor point for application suggestions and the context for the suggestions the XR device is making. Based on this anchor point and context, the XR device has identified three applications that match, and have suggested them in the application suggestion area 1104 proximate the identified object 1102. These suggestions include application indications 1106, 1108, and 1110. FIG. 11B is a conceptual diagram illustrating an example 1140 of receiving authorization for a selection of a suggested through a drag gesture. In example 1140, a user 1142 has made a pinch gesture to start a virtual ray 1144. The user 1142 directed (not shown) the virtual 1144 at the application indication 1106. Then, as indicated by arrow 1146, dragged the application indication 1106 inside the border of object 1102. The XR device recognizes this as an action to authorize the application indicated by 1106, causing progressive download of the application's components and providing permissions for the application to create an augment in relation to object 1102. FIG. 11C is a conceptual diagram illustrating an example 1170 of an authorized application generating an augment in relation to a context. In example 1170, the authorized application has requested a space 1172 as an augment locked to object 1102 and, based on the assigned application permissions, has been authorized to write into that space 1172. The authorized application thus writes content 1174— showing transit options related to the content of the transit sign object 1102— into the space 1172.

Figure 12:
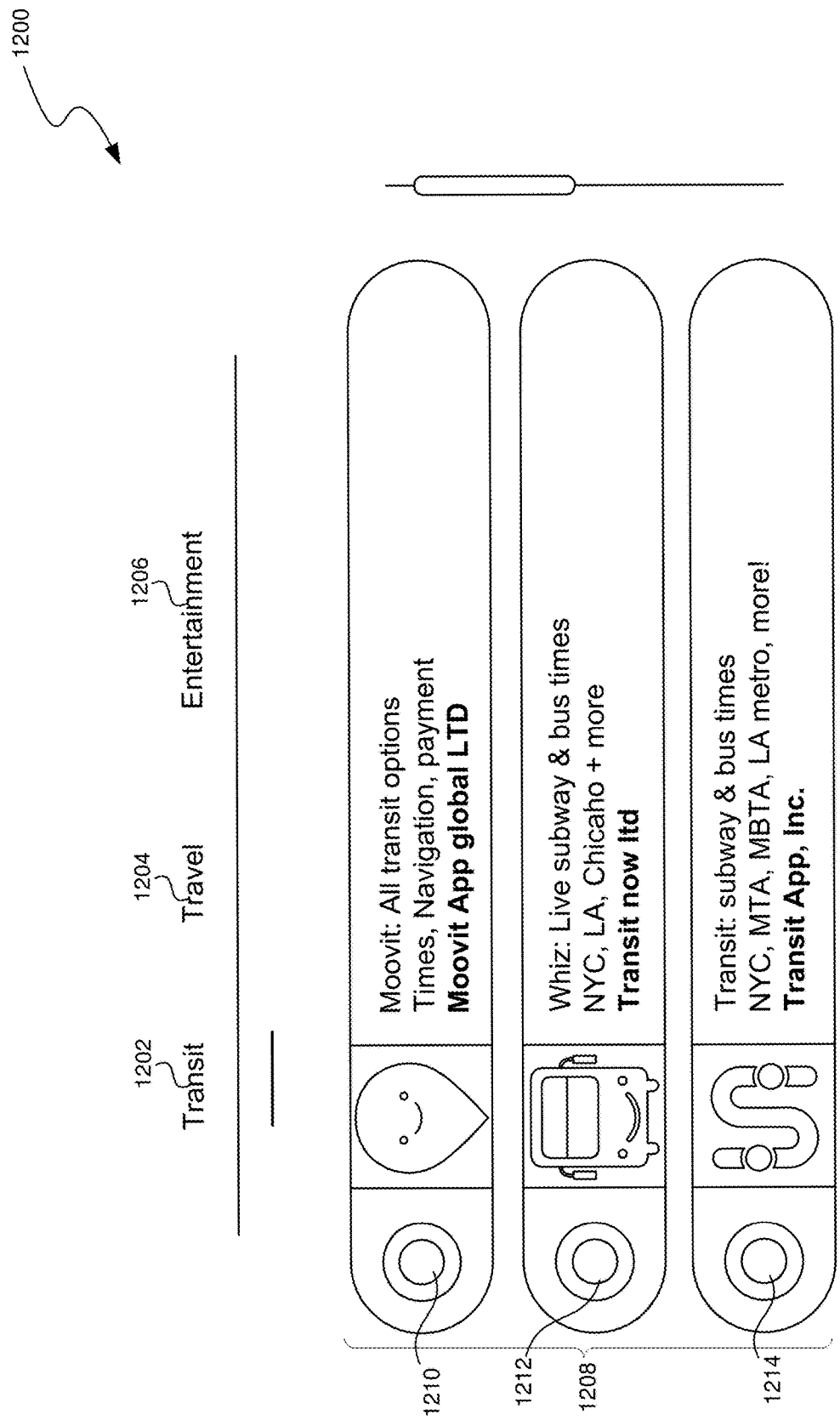
FIG. 12 is a conceptual diagram illustrating an example of an application manager.

FIG. 12 is a conceptual diagram illustrating an example 1200 of an application manager. In example 1200, a user has provided a command to access the application manager, e.g., through activation of a UI control or voice command. In this example, the application manager has divided the set of applications installed on the XR device into three categories: Transit 1202, Travel 1204, and Entertainment 1206. Applications have been put into these categories according to meta-data tags assigned to them by the application creators. The user can select any of these categories as a filter for the list of applications to show. In example 1200, the user has selected the Transit 1202 category. This shows the list 1208 of the installed transit applications. Each of the applications in the list is associated with a control (1210, 1212, and 1214), which can be selected or de-selected to enable to disable the corresponding application. In example 1200, the user has de-selected control 1212, to disable it. This revokes the permissions for that application to create any augments in the artificial reality environment. It also schedules the components of this application to be deleted as storage space is required on the XR device.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

A "machine learning model" (sometimes referred to as a model), as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats. In some implementations, the model can be a neural network with multiple input nodes. The input nodes can correspond to functions that receive input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input. In some implementations, such neural networks, known as deep neural networks, can have multiple layers of intermediate nodes with different configurations, can be a combination of models that receive different parts of the input and/or input from other parts of the deep neural network, or are convolutions or recurrent —partially using output from previous iterations of applying the model as further input to produce results for the current input.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for suggesting, authorizing, and controlling application output in an artificial reality (XR) device, the method comprising:
    identifying one or more artificial reality environment anchor points, which specify real-world locations, to which application output will be attached in an artificial reality environment;
    determining a plurality of features of a current XR context, defining a) characteristics of a user and b) an automatically determined state of the real-world in a vicinity of the user, the current XR context comprising one or more of: determinations based on sensor data gathered by the XR device, data retrieved from a third party source, data local to the XR device, or any combination thereof;
    providing suggestions for one or more applications that match the current XR context and at least one anchor point of the one or more artificial reality environment anchor points, wherein each particular application is identified by:
        determining that a) a threshold subset of multiple features from the plurality of features of the current XR context have been mapped to the particular application and that b) the particular application is configured to provide output in relation to the at least one anchor point; or
        applying a machine learning model, trained to determine a match score, to multiple features of the current XR context and to a type specified for the particular application, and determining that a resulting match score is above a threshold;
    receiving a user action to authorize a selected application of the suggested one or more applications;
    in response to the user action:
        obtaining components of the selected application; and
        setting permissions for the selected application that allow the selected application to provide output, in the artificial reality environment, attached to the at least one anchor point; and
    identifying a user intent by identifying that a user ignored or closed a threshold amount of outputs from the selected application within a time window; and
    in response to identifying the user intent, removing one or more of the permissions set for the selected application.

2. The method of claim 1, wherein each of the one or more anchor points corresponds to a respective particular real-world object identified by the XR device.

3. The method of claim 1, wherein the current XR context comprises:
    one or more identified objects in the artificial reality environment,
    current location data for the XR device, one or more aspects of a user state and/or one or more relationships to one or more other users identified in the area of the XR device, and environment conditions.

4. The method of claim 1, wherein identifying the one or more applications is performed by the determining that the threshold subset of features from the current XR context has been mapped to the particular application.

5. The method of claim 1, wherein identifying the one or more applications is performed by the applying the machine learning model.

6. The method of claim 1, wherein identifying each particular application further comprises:

determining a category, of multiple categories, for each of one or more potential applications; and adding, to the suggestions for one or more applications, a maximum amount of the one or more potential applications in one of the multiple categories, wherein at least one of the one or more potential applications is excluded from the suggestions for one or more applications due to the maximum amount already having been reached for the category of that application.

7. The method of claim 1, wherein the received user action includes identifying a user hand gesture that indicates the selected application, from the suggestions, and drags an indication of the selected application to another location in the artificial reality environment.

8. The method of claim 1, wherein the obtaining components of the selected application comprises:

determining, based on which aspects of the selected application will be used to provide the output in the artificial reality environment, a priority order for the components of the selected application; and scheduling download of the components of the selected application according to the priority order.

9. The method of claim 1, wherein the permissions set for the selected application include two or more of:

permissions for creating augments in the artificial reality environment, permissions to provide notifications, permissions to access input signals, permissions to receive context features, permissions to write into a shared XR space, permissions to exchange objects or other data with other authorized applications, or any combination thereof.

10. A non-transitory computer-readable storage medium storing instructions that, when executed by a computing system, cause the computing system to perform a process for suggesting, authorizing, and controlling application output in an artificial reality (XR) device, the process comprising:

determining a current XR context comprising one or more of: determinations based on sensor data, data retrieved from a third party source, data local to the XR device, or any combination thereof;

providing suggestions for one or more applications that match the current XR context, wherein each particular application is identified by:

determining that a threshold subset of features from the current XR context have been mapped to the particular application; or applying a machine learning model, trained to determine a match score, to multiple features of the current XR context and to a type specified for the particular application, and determining that a resulting match score is above a threshold;

receiving a user action to authorize a selected application of the suggested one or more applications;

in response to the user action, setting permissions for the selected application that allow the selected application to provide output;

identifying a user intent by identifying that a user ignored or closed a threshold amount of outputs from the selected application; and in response to identifying the user intent, removing one or more of the permissions set for the selected application.

11. The non-transitory computer-readable storage medium of claim 10, wherein the process further comprises obtaining components of the selected application by:

determining, based on which aspects of the selected application will be used to provide the output, a priority order for the components of the selected application; and scheduling download of the components of the selected application according to the priority order.

12. The non-transitory computer-readable storage medium of claim 10, wherein the current XR context comprises:

one or more identified objects, current location data for the XR device, and calendar items for a current user.

13. The non-transitory computer-readable storage medium of claim 10, wherein identifying the one or more applications is performed by the determining that the threshold subset of features from the current XR context have been mapped to the particular application.

14. The non-transitory computer-readable storage medium of claim 10, wherein identifying the one or more applications is performed by the applying the machine learning model.

15. A computing system for suggesting, authorizing, and controlling application output in an artificial reality (XR) device, the computing system comprising:

one or more processors; and one or more memories storing instructions that, when executed by the one or more processors, cause the computing system to perform a process comprising:

determining a plurality of features of a current XR context, defining a) characteristics of a user and b) an automatically determined state of the real-world in a vicinity of the user, the current XR context comprising one or more of: determinations based on sensor data, data retrieved from a third party source, data local to the XR device, or any combination thereof;

providing suggestions for one or more applications that match the current XR context, wherein each particular application is identified by:

determining that a threshold subset of multiple features from the plurality of features of the current XR context have been mapped to the particular application; or applying a machine learning model, trained to determine a match score, to multiple features of the current XR context and to a type specified for the particular application, and determining that a resulting match score is above a threshold;

receiving a user action to authorize a selected application of the suggested one or more applications;

in response to the user action, setting permissions for the selected application that allow the selected application to provide output;

identifying a user intent by identifying that a user ignored or closed a threshold amount of outputs from the selected application; and in response to identifying the user intent, removing one or more of the permissions set for the selected application.

16. The computing system of claim 15, wherein the received user action includes identifying a user hand gesture that indicates the selected application, from the suggestions, and drags an indication of the selected application to another location.

17. The computing system of claim 15, wherein identifying each particular application further comprises:

determining a category, of multiple categories, for each of one or more potential applications; and adding, to the suggestions for one or more applications, a maximum amount of the one or more potential applications in one of the multiple categories, wherein at least one of the one or more potential applications is excluded from the suggestions for one or more applications due to the maximum amount already having been reached for the category of that application.

18. The computing system of claim 15, wherein the permissions set for the selected application include two or more of:

permissions for creating augments, permissions to receive context features, permissions to exchange objects or other data with other authorized applications, or any combination thereof.

\* \* \* \* \*